United States Patent
Yamamoto et al.

[11] Patent Number: 6,058,084
[45] Date of Patent: May 2, 2000

[54] DISK-SHAPED RECORDING MEDIUM USING SEGMENT ID AND DISK UNIT USING THE DISK-SHAPED RECORDING MEDIUM

[75] Inventors: Noriyuki Yamamoto; Takamichi Yamakoshi, both of Kanagawa, Japan

[73] Assignee: Sony Corporation, Tokyo, Japan

[21] Appl. No.: 08/945,333

[22] PCT Filed: Feb. 27, 1997

[86] PCT No.: PCT/JP97/00569

§ 371 Date: Jan. 8, 1998

§ 102(e) Date: Jan. 8, 1998

[87] PCT Pub. No.: WO97/32306

PCT Pub. Date: Sep. 4, 1997

[30] Foreign Application Priority Data

Feb. 27, 1996 [JP] Japan .................................. 8-040084
Jun. 17, 1996 [JP] Japan .................................. 8-155786

[51] Int. Cl.[7] .................... G11B 5/09; G11B 5/596
[52] U.S. Cl. ........................ 369/47; 369/50; 360/77.08
[58] Field of Search .................. 369/44.26, 44.27, 369/44.28, 32, 33, 47, 48, 50, 275.3; 360/77.08, 78.14

[56] References Cited

U.S. PATENT DOCUMENTS 5,523,903   6/1996   Hetzler et al. ..................... 360/77.08

FOREIGN PATENT DOCUMENTS

0660324 A2   6/1995   European Pat. Off. ........ G11B 20/12
3-130928     6/1991   Japan .............................. G11B 7/007
7-211006     8/1995   Japan .............................. G11B 20/12

*Primary Examiner*—Paul W. Huber
*Attorney, Agent, or Firm*—Limbach & Limbach L.L.P.

[57] ABSTRACT

The present invention relates to a disk unit or the like capable of improving the reliability of a sector ID-less system and performing rapid frame synchronization. A disk 101 has a plurality of segments (frames) extending in the direction of rotation thereof, each of which has servo regions for recording servo information and data regions for recording user data. A segment ID 105 is recorded in an address region in each servo region in the segment proportions of four to one. The segment ID is a code having information about frame numbers (segment numbers) as viewed from the position of origin and recorded with CRC added thereto. Owing to the detection of the segment ID 105 on the disk 101, the disk unit can rapidly establish frame synchronization, e.g., restrain a reduction in transfer rate used when, for example, data is recorded on both surfaces and reproduced therefrom. Even upon writing, the disk unit can detect out-of-frame synchronization, using the segment ID 105 and shift to an urgent write inhibiting process. Further, erroneous writing developed in the sector ID-less system can be avoided promptly.

23 Claims, 16 Drawing Sheets

FIG. 2

| FRAME NUMBER (7 bit) | CRC (5 bit) |
|---|---|

FRAME
NUMBER

| FRAME NUMBER (7 bit) | CRC (5 bit) |
|---|---|

FRAME
NUMBER

| | | | | | | | | | | | |
|---|---|---|---|---|---|---|---|---|---|---|---|
| 0 → | 0 | 0 | 1 | 1 | 0 | 0 | 0 | 0 | 1 | 1 | 1 | 1 |
| 1 → | 0 | 0 | 1 | 1 | 0 | 1 | 1 | 0 | 0 | 1 | 0 | 1 |
| 60 → | 0 | 1 | 0 | 0 | 1 | 1 | 1 | 0 | 0 | 1 | 1 | 0 |

FIG. 15 (PRIOR ART)

| LBA | HEAD | TRACK | SECTOR |
|---|---|---|---|
| ⋮ | ⋮ | ⋮ | ⋮ |
| 0 0 A 0 | 0 | 0 0 1 0 | 0 0 0 0 |
| 0 0 A 1 | 0 | 0 0 1 0 | 0 0 0 1 |
| 0 0 A 2 | 0 | 0 0 1 0 | 0 0 0 3 |
| 0 0 A 3 | 0 | 0 0 1 0 | 0 0 0 4 |
| 0 0 A 4 | 0 | 0 0 1 0 | 0 0 0 5 |
| 0 0 A 5 | 0 | 0 0 1 0 | 0 0 0 6 |
| ⋮ | ⋮ | ⋮ | ⋮ |

FIG. 16 (PRIOR ART)

| SECTOR | DEFECT | FRAME | COUNT |
|---|---|---|---|
| 0 | 0 | 0 | a |
|   | 0 | 1 | 0 |
| 1 | 0 | 1 | b |
|   | 0 | 2 | 0 |
| 2 | 1 | 2 | c |
|   | 1 | 3 | 0 |
| 3 | 0 | 3 | d |
|   | 0 | 4 | e |
|   | 0 | 5 | 0 |
| 4 | 0 | 5 | f |
|   | 0 | 6 | 0 |
| ⋮ | ⋮ | ⋮ | ⋮ |

6,058,084

1

DISK-SHAPED RECORDING MEDIUM USING SEGMENT ID AND DISK UNIT USING THE DISK-SHAPED RECORDING MEDIUM

TECHNICAL FIELD

This invention relates to a disk-shaped recording medium suitable for use in, for example, a magnetic disk unit or an optical disk device, and a disk unit using the disk-shaped recording medium. This invention relates specifically to a disk-shaped recording medium capable of recording segments IDs indicative of positions of the direction of rotation in a servo region thereof to improve the reliability of a sector ID-less system and to establish rapid frame synchronization. The invention also relates to a disk unit using the disk-shaped recording medium.

BACKGROUND ART

Servo regions for recording servo information and data regions for recording user data have heretofore been formed alternately in a disk-shaped recording medium employed in a disk unit, such as a magnetic disk unit or a magnet-optic disk device, along the direction of rotation of the disk-shaped recording medium. A sample servo system is known for generating a clock signal for obtaining timing in order to reproduce servo information or record and reproduce user data. This type of system generates a clock signal from a clock mark recorded in advance at a discrete position (e.g., servo region) on the disk-shaped recording medium by a magnetic means or a physical means. Further, a sector servo system for generating a clock signal from a data string itself is also known.

The prior art will hereinafter be described using a sample servo type magnetic disk unit as an example.

FIG. 11 shows one example of a magnetic disk employed in a sample servo type magnetic disk unit. The magnetic disk 201 has concentric or spiral tracks. Each of the tracks is uniformly divided into a plurality of segments (frames), e.g., 100 segments along the direction of rotation thereof. Further, the plurality of segments are respectively divided into servo regions (servo segments) for recording servo information and data regions (data segments) for recording user data.

The servo region comprises an address region, a fine region and a clock region. A clock mark 202 for generating a clock signal is radially and continuously recorded in the clock region. In a reproduce isolated or solitary waveform of the clock mark 202, for example, the time of presence of a peak indicates the supply of clock information synchronized with the rotation of the magnetic disk 201 to a data system and a servo system.

A fine pattern 204 is recorded in the fine region. In a magnetic head positioning servo, the fine pattern 204 is a pattern which is required by a tracking mode for accurately positioning a head to the center of a target track by the magnetic head positioning servo and indicates the position of the magnetic head relative to the track. The fine pattern 204 is composed of four magnetic patterns of A, B, X and Y.

An access pattern (track address code) 203 is recorded in the address region. The access pattern 203 is a pattern which is required in a track seek mode for shifting the magnetic head to the target track by the magnetic head positioning servo, encoding track addresses by, for example, gray codes, and changing them in length and layout so that they differ every track.

2

The clock mark 202 is synchronized by a clock generating circuit to be described later. However, the approximate position of presence of the clock mark 202 must be sought before the establishment of initial synchronization. As a synchronous auxiliary pattern, a unique pattern 205 is recorded in the address region in a predetermined cycle in place of the access pattern 203, e.g., at several tens of points per one track. The unique pattern 205 is composed of a plurality of lines (patterns) continuous in the radial direction. The unique pattern 205 can be easily detected even before the generation of the clock signal. For example, a violation code, which does not appear in an encoded data series, is normally used. Upon establishment of initial synchronization, the unique pattern 205 is first detected and a clock gate signal is thereafter generated after the elapse of a predetermined number of clocks, whereby the reproduce isolated waveform corresponding to the clock mark 202 is extracted.

In order to recognize the position of the magnetic disk 201 in its direction of rotation, a pattern 206, which is called a "home index pattern", is recorded in an address region as one per perimeter, as an alternative to the unique pattern 205. After the initial synchronization has been established by the unique pattern 205, the detection of the home index pattern 206 is kept in a waiting state until the magnetic disk 201 makes a round at worst, in order to recognize the position (corresponding to the position where the magnetic head is floating) of the magnetic disk 201 in its direction of rotation thereof. Afterwards, frame synchronization (segment synchronization) is established. Thus, the magnetic disk unit is finally shifted to a normal recordable and reproducible mode.

User data is recorded in the data region and reproduced therefrom in units of, for example 512 bytes called "sectors". Further, the user data corresponding to each sector is recorded, for example, with a sector ID (Sector Identification Code) or an ECC (Error Correction Code) added thereto. Definition information corresponding to a data sector, flag information indicative of a defective sector, ect. are recorded as sector IDs together with a CRC (Cyclic Error Detection Code). Each sector ID has skip information indicating that the sector cannot be used due to, for example, defects, as well as information such as a track number, a head number and a sector number (see FIG. 12).

Incidentally, the above-described segments and sectors are not in a one-to-one correspondence with one another. FIG. 13 shows an example of the correspondence of segments (frames) and sectors. In this example, a sector 0 extends over a frame 0 and a frame 1, whereas a sector 1 extends over the frame 1 and a frame 2. Recording and reproducing operations effected on each sector are carried out while repeating their stop or resumption so that the servo regions intruded or introduced into the sectors are masked. These operations are done by controlling a hard disk controller (HDC) or a recording and reproducing circuit system in accordance with a timing signal output from a timing generating circuit.

Now, a system for recording user data without adding sector IDs thereto has recently been proposed and realized. In this type of sector ID-less system, information for each sector ID is stored in a, for example, semiconductor memory without being stored on the magnetic disk 201. Thus, a few percentage of regions that must be originally ensured on the magnetic disk 201 as a sector ID region, can be applied for the recording of the user data.

FIG. 14 shows a conventional magnetic disk unit 210 of a sector ID-less system.

The magnetic disk unit 210 has a magnetic head 211 for recording data in, and reproducing it from, the magnetic disk 201. The magnetic head 211 is mounted to one end of an arm (not shown) held by a rotatable pivot. A voice coil motor (VCM) 212 used as a drive motor is mounted to the other end of the arm.

Further, the magnetic disk unit 210 includes a hard disk controller (HDC) 213 having an interface function for interfacing to a host computer, a data write/read control function, a function for adding an error correction code to write data and effecting an error correction on read data, etc., and a microprocessor (MPU) 214 for controlling the operation of the entire unit.

Here, programs for operating the microprocessor 214 are stored in a ROM (Read Only Memory) 214M incorporated in the microprocessor 214. A conversion table for converting logical block numbers LBA (Logical Block Address), each given during a write or read command produced from the host computer, to their corresponding physical positions (head number, track number, frame number and sector number) of the magnetic disk 201, and a sector ID information table 215 which indicates information about sectors with sector numbers, are stored in a boot region of the magnetic disk or a memory such as an EEPROM. FIG. 15 shows one example of a conversion table and FIG. 16 illustrates one example of a sector ID information table (they refer to corresponding examples shown in FIG. 13).

The magnetic disk unit 210 has a buffer RAM (random access memory) 215 for temporarily storing write data transferred from the host computer and read data transferred to the host computer. Incidentally, a sector ID information table 215T is generated on the buffer RAM 215. This is copied from the boot region of the disk or the memory, such as the EEPROM, upon drive initialization.

The sector ID information table shown in FIG. 16 will now be described. A defect indicates that its corresponding sector cannot be used due to the defect. A count indicates the number of bytes up to the initiation of the servo region and shows the proceeding to a process for stopping the recording and reproduction of data after the elapse of the number of the bytes till the passage of the servo region. Incidentally, "0" shows that the servo region does not interrupt its sector.

The magnetic disk unit 210 includes a record data generating circuit 216 for effecting a digital modulating process and a write compensating process on write data read from the buffer RAM 215 upon writing and added with an error correction code by the hard disk controller 213 and thereby generating record data, and a recording amplifier 217 for obtaining a recording current signal corresponding to the record data generating circuit 216. Upon the write compensating process, a micro-correction in magnetization reversal timing at writing is effected on a peak shift of a read signal due to magnetization reversal interference produced upon high-density recording.

The magnetic disk unit 210 has a reproducing amplifier 218 for amplifying a signal reproduced from the magnetic disk 201 by the magnetic head 211 upon reading, and a selector switch 219 for supplying the recording current signal output from the recording amplifier 217 to the magnetic head 211 upon recording and for supplying the signal reproduced from the magnetic disk 201 by the magnetic head 211 upon reproduction. In this case, a fixed terminal on the W side of the selector switch 219 is electrically connected to the output side of the recording amplifier 217. A fixed terminal on the R side of the selector switch 219 is electrically connected to the input side of the reproducing amplifier 218 and a movable terminal of the selector switch 219 is electrically connected to the magnetic head 211.

The magnetic disk unit 210 includes a data demodulator circuit 220 for detecting a waveform peak from a signal output from the reproducing amplifier 218 and effecting a digital demodulating process on the detected pulse, to thereby obtain read data. The read data has been added with the error correction code and is stored in the buffer RAM 215 after having been subjected to the error correcting process by the hard disk controller 213.

The magnetic disk unit 210 has a clock generating circuit 221 for detecting a reproduced signal corresponding to a clock mark from the signal output from the reproducing amplifier 218 and for generating a clock signal synchronized with the rotation of the magnetic disk 201 based on the detected signal, and a servo information detector 222 for detection of servo information from the output signal of the reproducing amplifier 218.

The servo information detector 222 comprises a detection portion for detecting a home index pattern from the reproduced signal and outputting a signal indicative of the position of origin of the magnetic disk 201, a detection portion for detecting a unique pattern from the reproduced signal upon initial synchronization and outputting a clock gate signal after the elapse of a predetermined number of clocks, a detection portion for detecting an access pattern from the reproduced signal and effecting a demodulating process on it to obtain track address information, and a detection portion for detecting a fine pattern from the reproduced signal and performing signal processing on it to obtain tracking information.

The clock generating circuit 221 is supplied with the clock gate signal from the servo information detector 222. Further, the clock generating circuit 221 extracts a reproduce isolated waveform corresponding to a clock mark in accordance with the clock gate signal, and generates a clock signal synchronized with the rotation of the magnetic disk 201 based on the reproduce isolated waveform. Incidentally, the clock signal generated from the clock generating circuit 221 is supplied to the servo information detector 222. Further, the clock signal generated from the clock generating circuit 221 is supplied to the aforementioned hard disk controller 213, record data generating circuit 216 and data demodulator circuit 220 and is also supplied to other necessary points.

The magnetic disk unit 210 has a position control circuit 223 for controlling the voice coil motor 212 in order to position the magnetic head 211 to a target track on the magnetic disk 201. The position control circuit 223 controls the voice coil motor 212 based on the track address information and tracking information output from the servo information detector 222. Incidentally, the position control circuit 223 is supplied with information about a target track address from the microprocessor 214 upon writing and reading user data, as will be described later.

Further, the magnetic disk unit 210 has a timing generating circuit 224 for generating timing signals indicative of positions of various information points on the magnetic disk 201. A signal indicative of the origin position is supplied from the servo information detector 222 to the timing generating circuit 224 as a reset signal. Further, the timing generating circuit 224 is supplied with the clock signal from the clock generating circuit 221. The timing generating circuit 224 counts the number of clocks from the position of the origin and generates various timing signals, based on its count value.

The timing signals may include, for example, a servo gate signal and a data gate signal necessary for a recording and reproducing circuit system, a signal indicative of the origin position of the magnetic disk 201 necessary for the hard disk controller 213, a frame pulse indicative of a frame start position, a byte pulse indicative of a byte start position, a sector pulse indicative of a sector start position, and a switching control signal for the selector switch 219.

FIG. 17 illustrates an example of a configuration of the hard disk controller 213.

The hard disk controller 213 has an I/O interface 231 for interfacing to the host computer, a buffer controller 232 for controlling the writing of data in, and reading of it from, the buffer RAM 215, a disk sequencer 233 for sequentially controlling the writing of user data in, and reading of it from, the magnetic disk 201, and a control register 234 for holding or retaining data values necessary for the sequential control of the disk sequencer 233.

The control register 234 has the function of counting the number of frames from the origin position and the function of counting the number of bytes from the sector start position. The I/O interface 231, the buffer controller 232, the disk sequencer 233 and the control register 234 are electrically connected to the microprocessor 214 through a bus 235.

Further, the hard disk controller 213 includes a chip controller 236 for supplying the various timing signals supplied from the timing generating circuit 224 to the disk sequencer 233 and the control register 234, and for generating a record gate signal in accordance with instructions issued from the disk sequencer 233 upon write operation and supplying it to the timing generating circuit 224, and a clock controller 237 for supplying the clock signal supplied from the clock generating circuit 221 to respective portions.

Moreover, the hard disk controller 213 includes a serializer/deserializer 238 for converting write data (parallel data) read from the buffer RAM 215 into serial data upon writing, converting read data subjected to an error correction by an ECC circuit 239 to parallel data upon reading, and supplying it to the buffer RAM 215, and the ECC circuit 239 for adding an error correction code to data output from the serializer/deserializer 238 upon writing, for supplying the data to the record data generating circuit 216, and for effecting an error correcting process on data output from the data demodulator circuit 220 upon reading.

The operation of the magnetic disk unit 210 shown in FIG. 14 will be described next.

Immediately after the turning on of the power or after the occurrence of an out of synchronism state, an initial synchronism establishing operation is carried out. In this case, the selector switch 219 is electrically connected to the R side so that a signal reproduced from the magnetic disk 201 by the magnetic head 211 is supplied to the reproducing amplifier 218 through the R side of the selector switch 219. Further, the servo information detector 222 detects a unique pattern from the output signal of the reproducing amplifier 218. After the occurrence of a predetermined number of clocks, a clock gate signal is supplied to the clock generating circuit 221 from the servo information detector 222. The clock generating circuit 221 regards a solitary reproduce waveform developed within a clock gate signal producing period as a normal clock mark reproduce waveform, updates the phase of the PLL (Phase-Locked Loop) held thereinside, and synchronizes the phase of a clock signal with a clock mark.

After the establishment of the initial synchronization, write/read operations are performed. Prior to the write/read operations, a sector ID information table 215T (see FIG. 16) is generated on the buffer RAM 215 under the control of the microprocessor 214.

The write operation control of the microprocessor 214 is carried out in accordance with a flowchart shown in FIG. 18.

When a write command sent from the host computer is received in Step ST1, an LBA is converted to physical positions (head number, track number, frame number, sector number) of the magnetic disk 201, using a conversion table (see FIG. 15) stored in a semiconductor memory, such as a disk or an EEPROM, in Step ST2.

Next, in Step ST3, necessary values such as a start frame number, the present sector number (leading sector number in a start frame—1), a start sector number, an end sector number, etc. are set to the control register 234 of the hard disk controller 213.

When, for example, the write command is one for providing instructions for writing of 3 sectors from an LBA "00A1", the LBA is converted to the head number="0", track number="0010", frame number="0001" and sector number="0001" in Step ST2. In Step ST3, the start frame number="0001", present sector number="0000", start sector number="0001" and end sector number="0004" (because the sector 2 is represented as a defect) are set.

In Step ST4, the microprocessor 214 controls the selector switch 219 so that it is connected to the R side in association with the servo region and to the W side in association with the data region. A target track address (track number) is set to the position control circuit 223. Thereafter, the position control circuit 223 is caused to start a track seek operation. The track seek operation is done as follows:

That is, the position control circuit 223 compares a track address, based on track address information obtained by detecting an access pattern 203 with the servo information detector unit 222, with the target track address and controls the voice coil motor 212 so that the a track address at the present position coincides with the target track address. After the track address at the present position has coincided with the target track address, the position control circuit 223 controls the voice coil motor 212, based on tracking information obtained by detecting a fine pattern 204 with the servo information detector unit 222, so that the magnetic head 211 is positioned to the center of a target track. When the magnetic head 211 is positioned to the center of the target track, the track seek is completed.

It is next determined in Step ST5 whether or not the track seek operation has been completed. Even though not mentioned above, information about the completion of the track seek operation is supplied from the position control circuit 223 to the microprocessor 214. When the track seek operation is completed, the microprocessor 214 starts the disk sequencer 233 of the hard disk controller 213 in Step ST6.

The disk sequencer 233 is controlled by various timing signals supplied from the timing generating circuit 224. The disk sequencer 233 reads write data temporarily stored in the buffer RAM 215 in predetermined timing. The serializer/deserializer 238 converts the write data into serial data, which is added with an error correction code by the ECC circuit 239, followed by supplying it to the record data generating circuit 216.

In this case, the frame counter of the control register 234 is counted up in response to the frame pulse output from the timing generating circuit 224. The present sector number of the control register 234 is counted up in response to a sector pulse output from the timing generating circuit 224.

It is determined in Step ST7 whether or not the count value has coincided with the start frame number. If it is determined in Step ST7 that the count value has coincided with the start frame number, it is then determined in Step ST8 whether or not the present sector number has coincided with the start sector number. When it is determined in Step ST8 that the present sector number has matched with the start sector number, the routine procedure proceeds to Step ST9.

In Step ST9, the microprocessor 214 confirms the absence of a defective sector (defect=0), the storage of the write data in the buffer RAM 215, etc., by reference to the sector ID information table of the buffer RAM 215. After conditions are met, the microprocessor 214 reads the write data from the buffer RAM 215 and transfers it to the record data generating circuit 216 as described above. As a result, the recording of data is started.

It is next determined in Step ST10 whether or not one sector has been completed. When it is determined in Step ST10 that one sector has been completed, the routine procedure proceeds to Step ST11 where it is determined whether the present sector number coincides with the end sector number. If it is determined in Step ST11 that the present sector number does not coincide with the end sector number, then the start sector number is changed so as to correspond to the next sector in Step ST12. Thereafter, the routine procedure is returned to Step ST7 where the same control as described above is executed. On the other hand, when it is determined in Step ST11 that the present sector number coincides with the end sector number, then the write operation is completed.

It is understood from the sector ID information table shown in FIG. 16 that the servo region is intruded in a sector 1 after a "b" byte subsequent to its start. Even though not described above, the recording is stopped in the servo region, based on the count of a byte counter of the control register 234. The disk sequencer 233 can access this information in the sector ID information table 215T of the buffer RAM 215 for every sector. Thus, the write operation can be allowed to proceed according to this information.

It is understood from the sector ID information table shown in FIG. 16 that since a sector 2 indicates that the defect= 1, it is a defective sector. In this case, the routine procedure bypasses Steps ST9 and ST10 and proceeds from Step ST8 to Step ST11.

Control on the read operation is performed in a manner similar to the control of the write operation described above. The disk sequencer 233 is started after the completion of track seek. Next, the start sector is accessed and the ECC circuit 239 performs an error correction process on read data output from the data demodulator circuit 220. Further, the so-processed read data is converted into parallel data by the serializer/deserializer 238, which in turn is supplied to the buffer RAM 215 where it is temporarily stored. Thereafter, the data is transferred to the host computer through the I/O interface 231. Incidentally, the selector switch 219 is electrically connected to the R side upon reading.

The aforementioned conventional magnetic disk unit 210 has the following problems:

(a) In the conventional synchronization establishment routine, a magnetic disk unit that has proceeded to the normal recordable and reproducible mode after the detection of the home index pattern 206 is kept in a waiting state, in order to recognize the position of rotation of the magnetic disk, until the magnetic disk has made a round subsequent to the establishment of the initial synchronization by the unique pattern 205. This rotation waiting time presents a problem upon switching between the surfaces. That is, when the data is recorded on and reproduced from both surfaces, the transfer rate is greatly reduced as compared with the normal transfer rate.

In order to avoid this, the positions of rotation of both surfaces need an extremely high-accuracy alignment upon recording the home index patter 206 or stamping. Recording and reproducing heads for the respective surfaces are required to be created with high accuracy relative to each other. However, this results in a great load on the manufacturing process. Since the number of servo samples increases and the physical width between the servo regions is so reduced, particularly in the case of the sample servo system, margin is correspondingly reduced. Even if the transfer rate is sacrificed, the present unit has no choice but to reconfirm the rotational positions from the viewpoint of reliability.

(b) The sector ID-less system for improving the efficiency of data offers a problem in terms of the reliability of the data during data recording. That is, since the data recording is started from the reading of the sector ID added with the CRC (cyclic error detection code), which has been written on the disk by formatting, the probability that data will be written in an erroneous position, is extremely low.

However, the writing of data in the erroneous position is still carried out in the sector ID-less system in the event that the counter of the hard disk controller 213 slips due to the missing of the frame pulse or sector pulse supplied to the hard disk controller 213. Further, a method of instantaneously preventing its writing has not been proposed. If the above writing has occurred in a track containing data written in the past, then data up to the origin position, where the counter is normally reset, is overwritten on the track, thus resulting in the risk of its destruction.

Incidentally, these problems occur even in a sector servo system.

It is therefore an object of the present invention to provide a disk-shaped recording medium capable of improving the reliability of a sector ID-less system and achieving prompt establishment of frame synchronization, and a disk unit using the disk-shaped recording medium.

DISCLOSURE OF THE INVENTION

A disk-shaped recording medium according to the present invention has concentric or spiral tracks, each divided into a plurality of segments in the direction of rotation thereof. The segments are respectively divided into servo regions for respectively recording servo information and data regions for respectively recording user data, the servo information recorded in each servo region including segment ID's respectively indicative of positions of the direction of rotation of the disk-shaped recording medium.

Further, a disk unit according to the present invention comprises servo information reproducing means for reproducing the servo information from the servo region of the disk-shaped recording medium, segment ID detecting means for detecting the segment ID from the reproduced servo information, and synchronism managing means for establishing frame synchronization using the detected segment ID.

A segment ID having information about a segment number (frame number) is, for example, recorded in the servo region of each segment of the disk-shaped recording medium for each predetermined number of segments (number of frames). The servo information reproducing means reproduces the servo information from the disk-shaped recording medium and the segment ID detecting means detects the segment ID from the servo information.

The synchronism managing means establishes frame synchronization by confirming that, for example, the segment ID is detected without an error.

BRIEF DESCRIPTION OF THE DRAWINGS

FIG. 2 is a diagram illustrating an example of a configuration of a segment ID;

FIG. 9 is a diagram showing another example of the configuration of the segment ID;

FIG. 15 is a diagram depicting one example of a conversion table;

FIG. 16 is a diagram showing one example of a sector ID information table;

BEST MODE FOR CARRYING OUT THE INVENTION

A best mode of this invention will be described with reference to the drawings. The present mode is one in which this invention is applied to a sample servo type magnetic disk unit.

Figure 1:
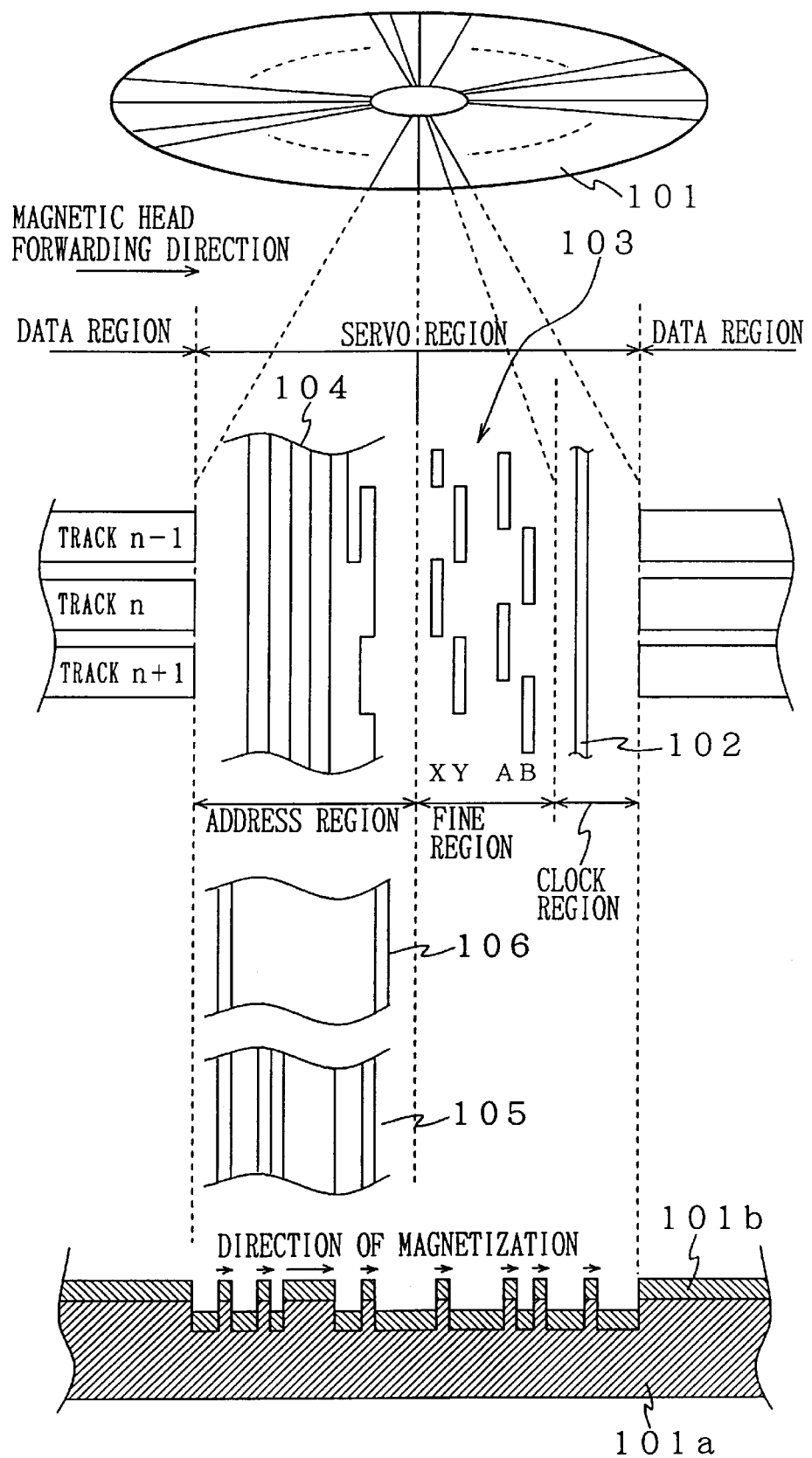
FIG. 1 is a diagram showing a magnetic disk as a best mode.

FIG. 1 shows a magnetic disk 101 employed in the present mode. The magnetic disk 101 has concentric or spiral tracks. Each track is uniformly divided into a plurality of segment such as 100 segments (frames), in the direction in which the magnetic disk 101 rotates. Each of the plurality of segments is divided into servo regions (servo segments) for recording servo information therein, and data regions (data segments) for recording user data therein.

Each of the servo regions comprises an address region, a fine region and a clock region. A clock mark 102 for generating a clock signal is radially and continuously recorded in the clock region. In a reproduce isolated, or solitary, waveform of the clock mark 102, for example, the time of presence of a peak indicates the supply of clock information synchronized with the rotation of the magnetic disk 101 to a data system and a servo system.

A fine pattern 103 is recorded in the fine region. In a magnetic head positioning servo, the fine pattern 103 is a pattern which is required in a tracking mode for accurately positioning a head to the center of a target track by a magnetic head positioning servo and indicates the position of a magnetic head relative to the track. The fine pattern 103 is composed of four magnetic patterns of A, B, X and Y.

In the address region, an access pattern (track address code) 104 is recorded in, for example, an odd-numbered segment in the pattern proportion of two to one. The access pattern 104 is a pattern which is required in a track seek mode for shifting the magnetic head to the target track by the magnetic head positioning servo, encoding track addresses by, for example, gray codes and changing them in length and layout so that they differ every track.

Further, a segment ID (Segment Identification Code) 105 is recorded in the address region in the proportion of four to one. The segment ID is a code having information about a frame number (segment number), as viewed from the position of an origin. Further, a unique pattern 106 is recorded in the address region in the pattern proportion of four to one in place of the segment ID 105. That is, the access pattern 104, the segment ID 105, and the unique pattern 106 are repeatedly recorded in the address region in the order of the access pattern 104, the segment ID 105, the access pattern 104, the unique pattern 106, the access pattern 104, the segment ID 105, ect.

The clock mark 102 is synchronized by a clock generating circuit to be described later. However, the approximate position of presence of the clock mark 102 must be sought before the establishment of initial synchronization. As a synchronous auxiliary pattern for this purpose, the unique pattern 106 is recorded in the address region as described above. The unique pattern 106 is composed of a plurality of lines (patterns) continuous in the radial direction. The unique pattern 106 can be easily detected even before the generation of the clock signal. A violation code or the like, which does not appear in an encoded data series, is normally used. Upon establishment of the initial synchronization, the unique pattern 106 is first detected, and a clock gate signal is thereafter generated after the elapse of a predetermined number of clocks, whereby the reproduce isolated waveform of the clock mark 102 is extracted.

FIG. 2 shows an example of a configuration of a segment ID 105. In the present example, the address region is comprised of 12 bits and the segment ID 105 is constructed such that 5-bit CRCs (cyclic error detection code) are added to 7-bit frame number (segment number) codes. The frame number codes indicate frame numbers (segment numbers) as they are and are numbered from 0 in turn. As a generating function, G(x) of CRC, e.g., $G(x)=(x+1)(x^4+x+1)$, is used. Here, the term (x4+x+1) indicates a primitive irreducible generating function.

Thus, a CRC high in detectability can be generated by defining the generating function G(x) of CRC as (x+1)× (primitive irreducible generating function). This depends on the following theorems.

"Theorem 1": (single error detection)

CRC generated by a generating function having two or more terms can detect all the single errors.

"Theorem 2": (odd error detection)

Coded words divided by the term (x+1) can detect odd errors.

"Theorem 3": (single and double error detection)

If a data block length of each coded word is below a period to which the generating function G(x) belongs, then all the coded words F(x) generated by G(x) can detect single and double errors.

"Theorem 4": (single, double and triple error detection)

All the coded words F(x) generated by the generating function G(x)=(x+1)×(primitive irreducible generating function) can detect single, double and triple errors if its length is below a period to which the primitive irreducible generating function belongs.

"Theorem 5": (burst error detection)

A coded word F(x) generated by an n-order generating function G (x) can detect an arbitrary burst error whose length is below n.

When a 12-bit coded word F(x) is generated from the expression $G(x)=(x+1)(x^4+x+1)$, all the single, double and triple errors and an arbitrary burst error whose length is below 5, can be detected from the above-described theorems. Here, the period to which the term $(x^4+x+1)$ belongs, is 15 (>12).

Incidentally, a high-order generating function may preferably be used. If the n-order generating function is generally used, a pattern in which the result of CRC operation or computation results in 0, appears in the access pattern 104 at a probability of $1/(2^{n-1})$.

Further, the above-described servo information is recorded in the servo region of the magnetic disk 101 as, for example, irregular pits. In this case, a magnetic layer 101b is formed on a non-magnetic substrate 101a after the irregular pits have been collectively shaped by stamping (see FIG. 1). Alternatively, a magnetic layer having a normal flat substrate with the magnetic layer formed thereon is formed as a pattern, independent of the data region, by partially removing the magnetic layer with a technique such as etching. This pattern is demagnetized in one direction by the magnetic head to form the segment ID 105, unique pattern 106, access pattern 104, clock mark 102 and fine pattern 103. When these patterns are reproduced by the magnetic head, a solitary or isolated waveform is reproduced at the leading and trailing edges of each pattern.

Figure 11:
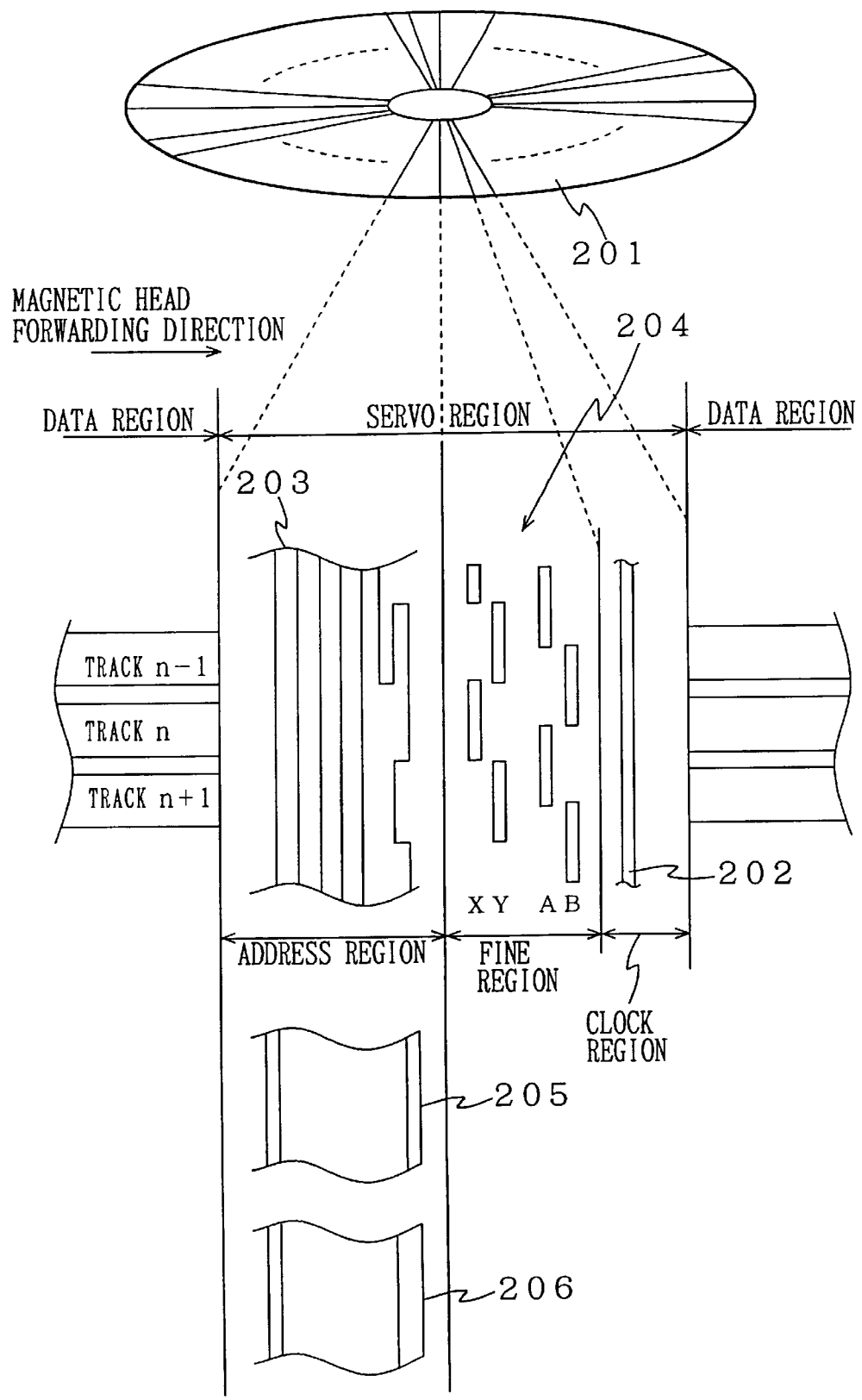
FIG. 11 is a diagram illustrating one example of a magnetic disk employed in a conventional sample servo type magnetic disk unit.
Figures 12, 13:
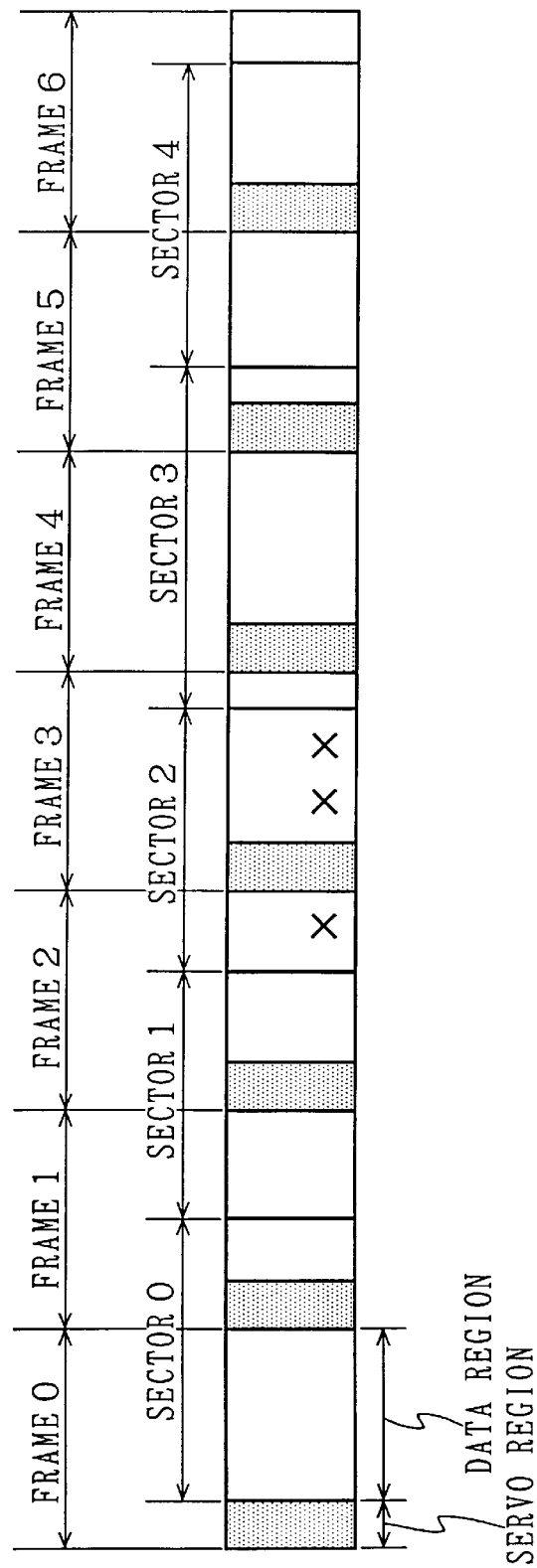
FIG. 12 is a diagram depicting an example of a sector ID.
FIG. 13 is a diagram showing an example of the correspondence between segments (frames) and sectors.

User data is recorded in and reproduced from the data region in units called "sectors" of, 512 bytes. User data of each sector is recorded with an ECC (error correction code) or the like added thereto. Incidentally, the segments are not in a one-to-one correspondence with the sectors in the manner similar to the magnetic disk 201 shown in FIG. 11 (see FIG. 13).

Figure 3:
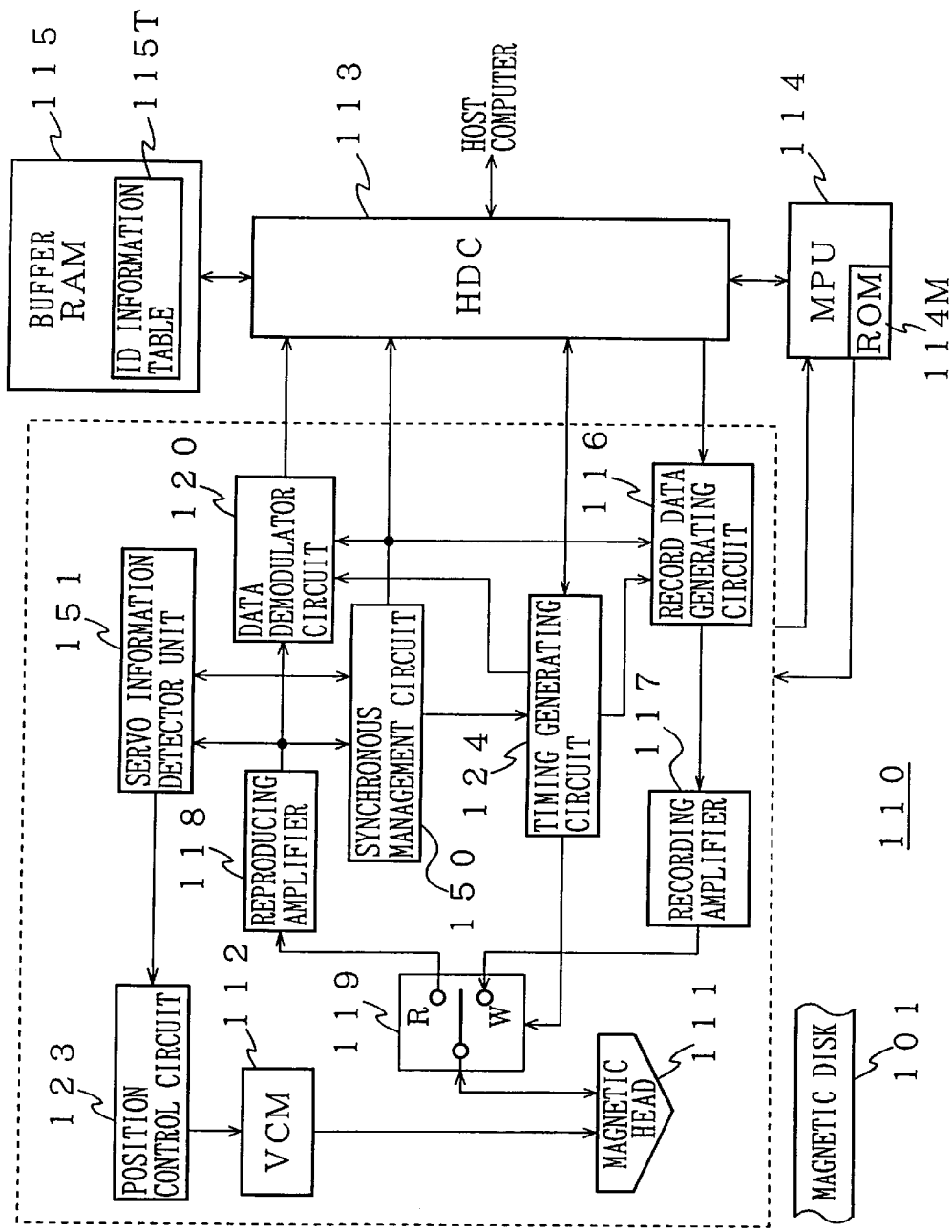
FIG. 3 is a block diagram depicting a sector ID-less type magnetic disk unit as a best mode.

FIG. 3 illustrates a sector ID-less type magnetic disk unit 110 as a best mode.

The magnetic disk unit 110 has a magnetic head 111 for recording data in, and reproducing it from, the magnetic disk 101. The magnetic head 111 is mounted to one end of an arm (not shown) held by a rotatable pivot. A voice coil motor (VCM) 112 used as a drive motor is mounted to the other end of the arm.

Further, the magnetic disk unit 110 includes a hard disk controller (HDC) 113 having an interface function for interfacing to a host computer, a data write/read control function, a function of adding an error correction code to write data and effecting an error correction on read data, etc., and a microprocessor (MPU) 114 for controlling the operation of the entire unit.

Here, programs for operating the microprocessor 114 are stored in a ROM 114M incorporated in the microprocessor 114. A conversion table for converting logical block numbers LBA, each given during a write or read command produced from the host computer, to their corresponding physical positions (head number, track number, frame number and sector number) of the magnetic disk 101, and a sector ID information table which indicates information about sectors with sector numbers, are stored in a boot region of the magnetic disk or a memory such as an EEPROM (see FIGS. 15 and 16).

The magnetic disk unit 110 has a buffer RAM 115 for temporarily storing write data transferred from the host computer and read data transferred to the host computer. Incidentally, a sector ID information table 115T is generated on the buffer RAM 115. This is copied from the boot region of the disk or the memory, such as the EEPROM, upon drive initialization.

The magnetic disk unit 110 includes a record data generating circuit 116 for affecting a digital modulating process and for affecting a write compensating process on write data read from the buffer RAM 115 upon writing and added with an error correction code by the hard disk controller 113 and thereby generating record data, and a recording amplifier 117 for obtaining a recording current signal corresponding to the record data generating circuit 116. Upon the write compensating process, a micro-correction in magnetization reversal timing at writing is effected on a peak shift of a read signal due to magnetization reversal interference produced upon high-density recording.

The magnetic disk unit 110 has a reproducing amplifier 118 for amplifying a signal reproduced from the magnetic disk 101 by the magnetic head 111 upon reading, and a selector switch 119 for supplying the recording current signal output from the recording amplifier 117 to the magnetic head 111 upon recording, and for supplying the signal reproduced from the magnetic disk 101 by the magnetic head 111 to the reproducing amplifier 118 upon reproduction. In this case, a fixed terminal on the W side of the selector switch 119 is electrically connected to the output side of the recording amplifier 117. A fixed terminal on the R side of the selector switch 119 is electrically connected to the input side of the reproducing amplifier 118 and a movable terminal of the selector switch 119 is electrically connected to the magnetic head 111.

The magnetic disk unit 110 includes a data demodulator circuit 120 for detecting a waveform peak from a signal output from the reproducing amplifier 118 and effecting a digital demodulating process on the detected pulse, hence, reproducing data to thereby obtain read data. The read data is added with the error correction code and is stored in the buffer RAM 115 after having been subjected to the error correcting process by the hard disk controller 113.

The magnetic disk unit 110 has a synchronous control or management circuit 150 for generating a clock signal synchronized with the rotation of the magnetic disk 101 and for generally controlling or managing the synchronization of a system, and a servo information detector unit 151 for detecting servo information from a signal output from the reproducing amplifier 118.

Figure 4:
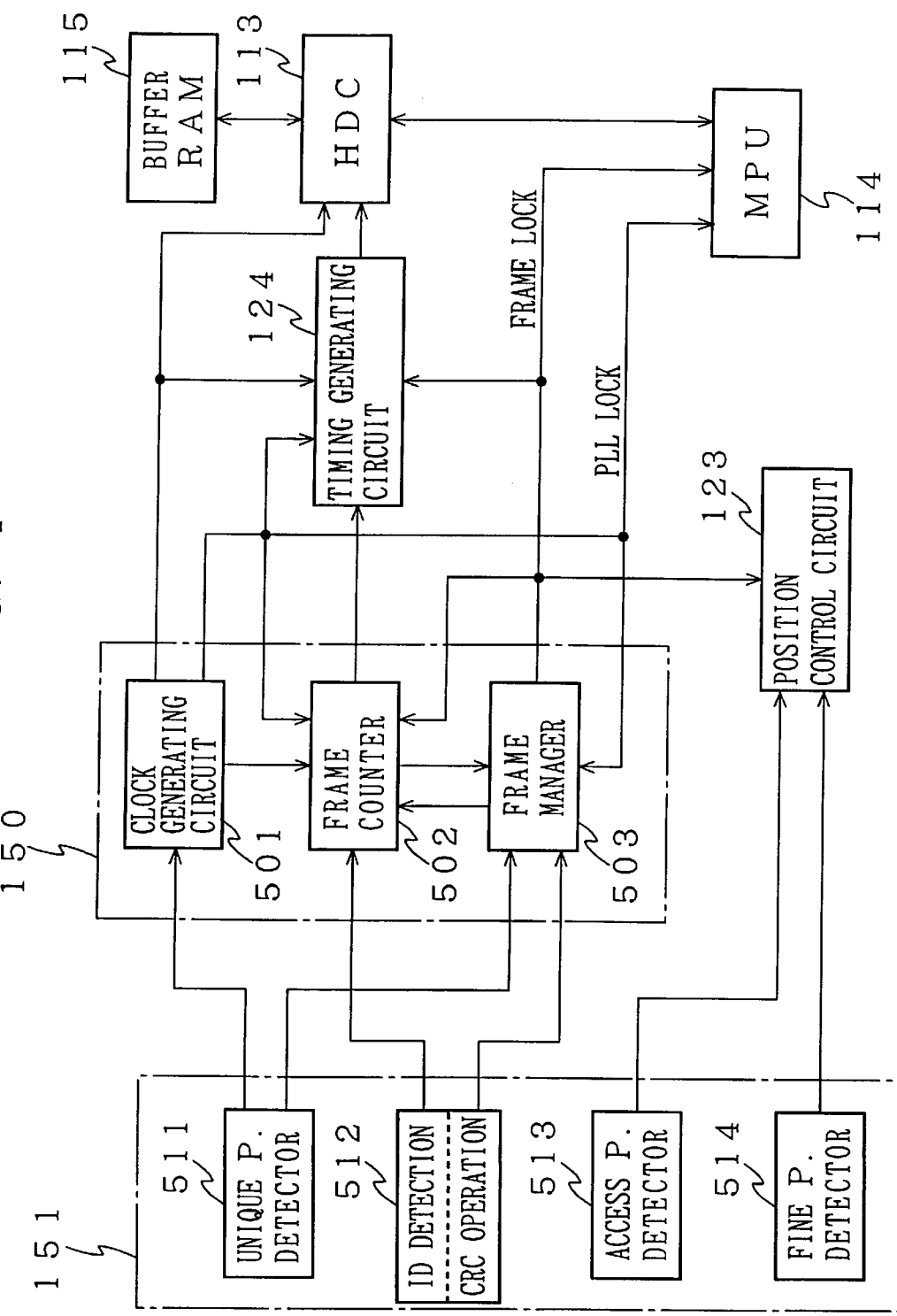
FIG. 4 is a block diagram showing specific configurations of a synchronous management circuit and a servo information detector, etc.

FIG. 4 shows specific configurations of the synchronous management circuit 150 and the servo information detector unit 151. The servo information detector unit 151 includes a unique pattern detector 511 for detecting a unique pattern 106 from a reproduced signal in a servo region and outputting a detection signal for the unique pattern, and for detecting the unique pattern 106 upon initial synchronization and outputting a clock gate signal after a predetermined number of clocks, a segment ID detector 512 for detecting and outputting data in an address region from the reproduced signal in the servo region and performing a CRC operation or computation on the data, an access pattern detector 513 for detecting an access pattern 104 from the reproduced signal in the servo region and effecting, for example, a decoding process on it to obtain track address information, and a fine pattern detector 514 for detecting a fine pattern 103 from the reproduced signal in the servo region and performing signal processing on it to obtain tracking information.

Now, the unique pattern detector 511, the segment ID detector 512 and the access pattern detector 513 are respectively supplied with data detected from the reproduced signal. When the result of the CRC operation on the data in the address region results in a predetermined value, e.g., "0" indicative of the absence of errors, the segment ID detector 512 outputs a CRC-OK signal.

Further, the synchronous management circuit 150 has a clock generating circuit 501 for generating a clock signal synchronized with the rotation of the magnetic disk 101, and a frame counter 502 for loading frame number data output from the segment ID detector 512 of the servo information detector unit 151 upon establishment of frame synchronization, counting the number of frames from the position of the origin and detecting whether or not the data (excluding a CRC portion) in the address region, which is detected by and outputted from the segment ID detector 512 after the above loading, coincides with a value obtained by counting the number of the frames. The frame counter 502 comprises, for example, an N-ary counter when the number of segments per track is N. When the counted value results in "0", the frame counter 502 outputs a signal indicative of the position of the origin therefrom.

Moreover, the synchronous management circuit 150 has a frame manager 503 for supplying a load signal to the frame counter 502 based on the detection signal for the unique pattern 106 output from the unique pattern detector 511 of the servo information detector unit 151, the CRC-OK signal output from the segment ID detector 512 and a coincidence detection signal output from the frame counter 502, for confirming that it is in a frame synchronous state and outputting a frame lock signal after its confirmation. The frame lock signal output from the frame manager 503 is supplied to the aforementioned microprocessor 114, a timing generating circuit 124 and a position control circuit 123 and is also supplied to other necessary points.

The clock generating circuit 501 is supplied with the clock gate signal from the unique pattern detector 511 of the servo information detector unit 151. The clock generating circuit 501 regards a solitary reproduce waveform signal developed in a reproduced signal within a clock gate signal producing period as a normal clock mark reproduced signal, updates the phase of PLL held thereinside and obtains a clock signal synchronized in phase with a clock mark. In addition to the clock signal, a PLL lock signal is output from the clock generating circuit 501 when the clock signal is synchronized in phase with the clock mark.

The clock signal generated from the clock generating circuit 501 is supplied to the servo information detector unit 151. Further, the clock signal generated from the clock generating circuit 501 is supplied, for example, to the hard disk controller 113, the record data generating circuit 116, the data demodulator circuit 120, the timing generating circuit 124, and other necessary points. Moreover, the PLL lock signal output from the clock generating circuit 501 is supplied to the microprocessor 114 and other necessary points.

The magnetic disk unit 110 has the position control circuit 123 for controlling the voice coil motor 112 in order to position the magnetic head 111 to a target track on the magnetic disk 201. The position control circuit 123 controls the voice coil motor 112 based on the track address information output from the access pattern detector 513 of the servo information detector unit 151 and the tracking information output from the fine pattern detector 514.

The frame clock signal output from the frame manager 503 of the synchronous management circuit 150 is supplied to the position control circuit 123. Incidentally, the position control circuit 123 is supplied with information about a target track address from the microprocessor 114 upon writing and reading user data, as will be described later.

Further, the magnetic disk unit 110 has the timing generating circuit 124 for generating timing signals indicative of various information-point positions on the magnetic disk 101. The timing generating circuit 124 is supplied with the frame number (count value) output from the frame counter 502 of the synchronous management circuit 150 and the clock signal output from the clock generating circuit 501. The timing generating circuit 124 counts the number of clocks from the position of the origin and generates various timing signals on the basis of the count value.

The timing signals may include, for example, a servo gate signal and a data gate signal necessary for a recording and reproducing circuit system, a signal indicative of the origin position of the magnetic disk, which is necessary for the hard disk controller 113, a frame pulse indicative of a frame start position, a byte pulse indicative of a byte start position, a sector pulse indicative of a sector start position, a switching control signal for the selector switch 119. Incidentally, the frame pulse is supplied even to the frame counter 502.

Figure 5:
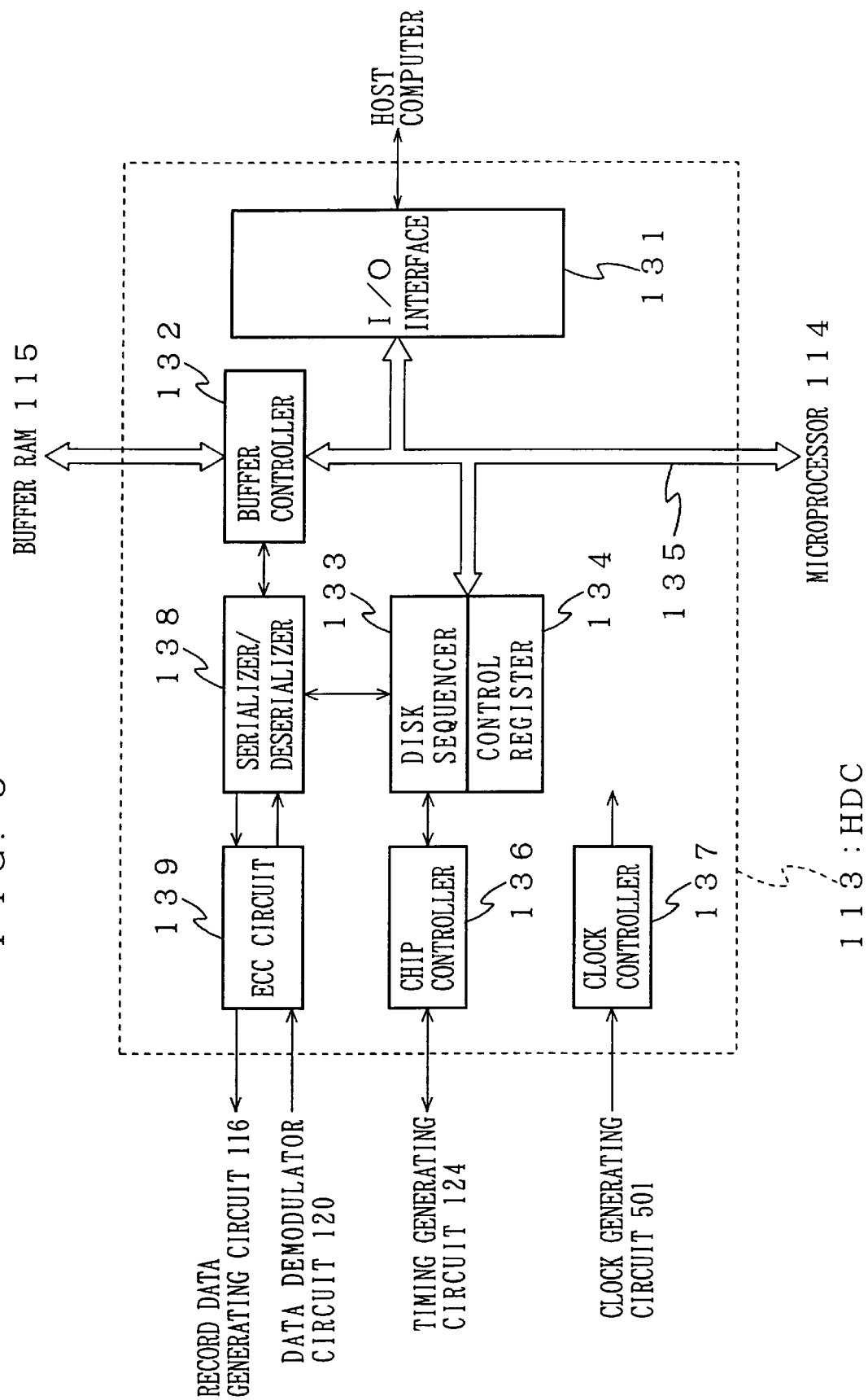
FIG. 5 is a is a block diagram illustrating an example of a configuration of a hard disk controller.

FIG. 5 illustrates an example of a configuration of the hard disk controller 113.

The hard disk controller 113 has an I/O interface 131 for interfacing to the host computer, a buffer controller 132 for controlling the writing of data in, and reading of it from, the buffer RAM 115, a disk sequencer 133 for sequentially controlling the writing of user data in, and reading of it from, the magnetic disk 101, and a control register 134 for holding or retaining data values necessary for the sequential control of the disk sequencer 133.

The control register 134 has the function of counting the number of frames from the origin position and the function of counting the number of bytes from the sector start position. The I/O interface 131, the buffer controller 132, the disk sequencer 133 and the control register 134 are respectively electrically connected to the microprocessor 114 through a bus 135.

Further, the hard disk controller 113 includes a chip controller 136 for supplying the various timing signals generated from the timing generating circuit 124 to the disk sequencer 133 and the control register 134, and for generating a record gate signal in accordance with instructions issued from the disk sequencer 133 upon write operation and supplying it to the timing generating circuit 124, and a clock controller 137 for supplying the clock signal supplied from the clock generating circuit 501 to respective portions.

Moreover, the hard disk controller 113 includes a serializer/deserializer 138 for converting write data (parallel data) read from the buffer RAM 115 into serial data upon writing, and for converting read data (serial data) subjected to an error correction by an ECC circuit 139 to parallel data upon reading and supplying it to the buffer RAM 115, and the ECC circuit 139 for adding an error correction code to data output from the serializer/deserializer 138 upon writing and supplying the data to the record data generating circuit 116 and for effecting an error correcting process on data output from the data demodulator circuit 120 upon reading.

The operation of the magnetic disk unit 110 shown in FIG. 3 will next be described.

Immediately after the turning on of the power or after the occurrence of an out of synchronism state, an initial synchronism establishing operation is carried out. Upon the initial synchronism establishing operation, a clock synchronizing process is first performed from the out-of synchronism state. After the clock synchronizing process, a frame synchronizing process is done. In this case, the selector switch 119 is connected to the R side so that a signal reproduced from the magnetic disk 101 by the magnetic head 111 is supplied to the reproducing amplifier 118 through the R side of the selector switch 119.

The clock synchronizing process will first be described. The unique pattern detector 511 of the servo information detector unit 151 detects a unique pattern 106 from a reproduced signal in a servo region. After the occurrence of a predetermined number of clocks, a clock gate signal is supplied to the clock generating circuit 501 of the synchronous management circuit 150. The clock generating circuit 501 regards a solitary reproduce waveform developed within a clock gate signal producing period as a normal clock mark reproduce waveform, updates the phase of PLL held thereinside, and synchronizes the phase of a clock signal with a clock mark. When the phase of the clock signal is synchronized with the clock mark to establish clock synchronization, the clock generating circuit 501 outputs a PLL lock signal therefrom.

Figure 6:
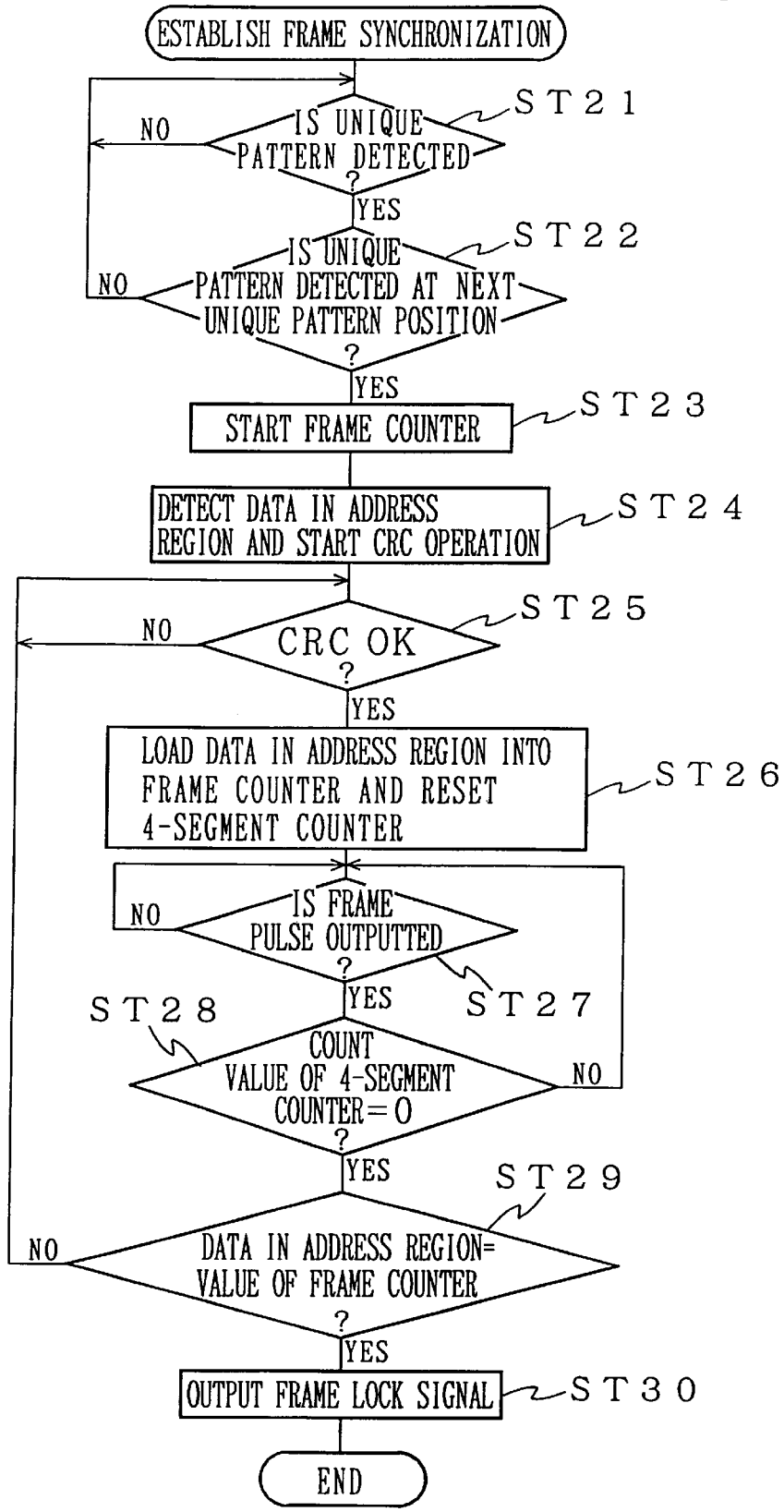
FIG. 6 is a flowchart for describing a frame synchronizing processing operation.

The frame synchronizing process will next be described using a flowchart shown in FIG. 6.

In Step ST21, the frame manager 503 of the synchronous management circuit 150 first determines, or makes a decision as to, whether or not the unique pattern 106 has been detected, based on the detection signal for the unique pattern 106 output from the unique pattern detector 511 of the servo information detector unit 151. When it is determined in Step ST21 that the unique pattern 106 has been detected, the frame manager 503 determines in Step ST22 whether the unique pattern 106 has been detected at the next unique pattern position and in an address region subsequent to four segments.

If it is determined in Step ST22 that the unique pattern 106 has been detected, then the frame counter 502 of the synchronous management circuit 150 is started in Step ST23. Thus, the frame counter 502 starts counting up in response to a frame pulse output from the timing generating circuit 124.

In Step ST24, the segment ID detector 512 of the servo information detector unit 151 next detects data in an address region from a reproduce or reproduced signal and starts a CRC operation. In Step ST25, the frame manager 503 determines whether or not a CRC-OK signal has been supplied from the segment ID detector 512. When it is determined in Step ST25 that the CRC-OK signal has been supplied from the segment ID detector 512, the frame manager 503 proceeds to Step ST26 where it supplies a load signal to the frame counter 502 and loads data (excluding CRC) in an address region, which is output from the segment ID detector 513, into the frame counter 502.

When the data in the address region is found to be a segment ID 105, the segment ID detector 512 outputs a CRC-OK signal. Therefore, the frame number data is considered to be normally loaded into the frame counter 502. However, even when the data in the address region is data corresponding to an access pattern 104, the segment ID detector 512 might output the CRC-OK signal. Therefore, the following processing is done.

Firstly, in Step ST26, a 4-segment counter is further reset to "0". This 4-segment counter comprises a quaternary counter and is incorporated into the frame manager 503, for example. Although not mentioned above, the 4-segment counter is counted up in response to a frame pulse output from the timing generating circuit 124 in a manner similar to the frame counter 502.

It is next determined in Step ST27 whether the frame pulse has been output from the timing generating circuit 124. If it is determined in Step ST27 that the frame pulse has been output from the timing generating circuit 124, then the 4-segment counter is counted up. In Step ST28, the frame manager 503 makes a decision as to whether or not the count of the 4-segment counter results in "0". If it is determined in Step ST28 that the count of the 4-segment counter has been brought to "0", then the frame manager 503 proceeds to Step ST29 where it is determined whether the data (excluding the CRC portion) in the address region detected by the segment ID detector 512 coincides with the count value corresponding to the number of frames.

When the data in the address region related to the output of the CRC-OK signal in Step ST25 is a segment ID in this case, the data in the address region, which is compared with the count of the frame counter 502 in Step ST29 after four segments, also results in the segment ID. Thus, the data (excluding the CRC portion) in the address region coincides with the count value corresponding to the number of the frames.

The frame manager 503 is supplied with the coincidence detection signal from the frame counter 502. When it is determined in Step ST29 that the two coincide with each other, the frame manager 503 outputs a frame lock signal and finishes the operation for processing the establishment of frame synchronization in Step ST30. On the other hand, when it is determined in Step ST29 that the two do not coincide with each other, the frame manager 503 is returned to Step ST25 where the same processes as described above are repeated.

In Steps ST21 and ST22 referred to above, the unique pattern 106 has been utilized. As an alternative to this, the access pattern 104 may be used.

An out-of-synchronism detecting process is carried out after the establishment of the initial synchronization. In this case, the frame manager 503 of the synchronous management circuit 150 detects an out-of synchronism state depending on whether or not the CRC-OK signal is output from the segment ID detector 513 of the servo information detector unit 151 and the coincidence detection signal is output from the frame counter 502 each time the count of the 4-segment counter reaches "0", i.e., the data in the address region results in the segment ID 105. When either one of the CRC-OK signal and the coincidence detection signal is not output, the frame manager 503 regards it as being out-of-frame synchronization and stops the outputting of the frame lock signal.

Write/read operations are performed in the aforementioned initial-state established state. Prior to the write/read operations, a second ID information table 115T (see FIG. 16) is produced on the buffer RAM 115 under the control of the microprocessor 114.

Figure 7:
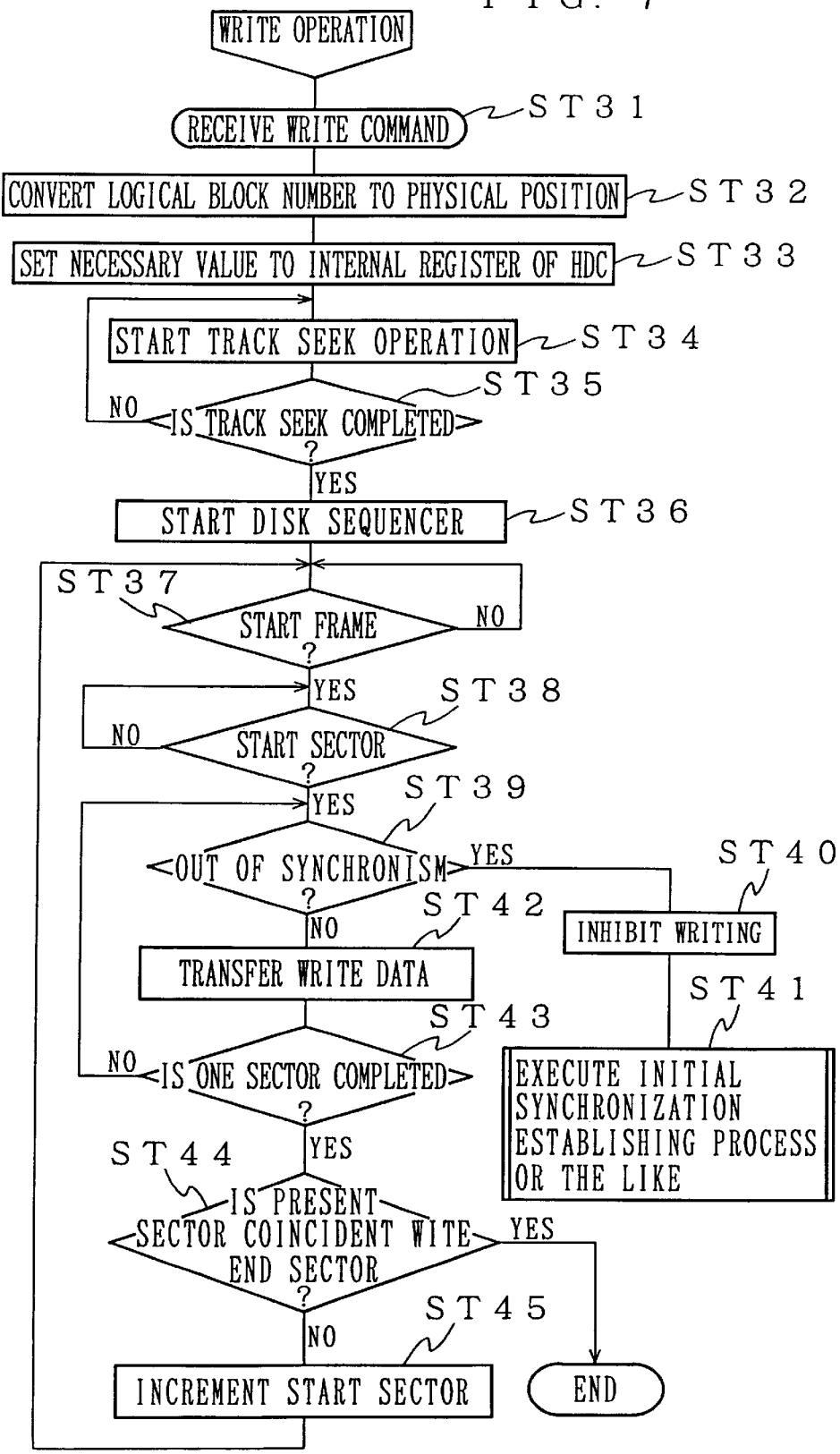
FIG. 7 is a flowchart for describing a write operation.

The write operation control of the microprocessor 114 is carried out in accordance with a flowchart shown in FIG. 7.

When the microprocessor 114 receives a write command sent from the host computer therein in Step ST31, an LBA is converted to a physical position (head number, track number, frame number, sector number) of the magnetic disk 101, using a conversion table (see FIG. 15) stored in a disk or a semiconductor memory, such as an EEPROM in Step ST32.

Next, in Step ST33, necessary values such as a start frame number, the present sector number (leading sector number in a start frame—1), a start sector number, an end sector number, etc. are set to the control register 134 of the hard disk controller 113.

In Step ST34, the microprocessor 114 controls the selector switch 119 so that it is connected to the R side in association with the servo region and to the W side in association with the data region. A target track address (track number) is set to the position control circuit 123. Thereafter, the position control circuit 123 is caused to start a track seek operation. The track seek operation is done as follows:

That is, the position control circuit 123 compares a track address based on track address information, obtained by detecting an access pattern 104 with the access pattern detector 513 of the servo information detector unit 151, with the target track address and controls the voice coil motor 112 so that a track address at the present position coincides with the target track address.

After the track address at the present position has coincided with the target track address, the position control circuit 123 controls the voice coil motor 112, based on tracking information obtained by detecting a fine pattern 103 with the fine pattern detector 514 of the servo information detector unit 151, so that the magnetic head 111 is positioned to the center of a target track. When the magnetic head 111 is positioned to the center of the target track, the track seek is completed.

It is next determined in Step ST35 whether or not the track seek operation has been completed. Although not mentioned above, information about the completion of the track seek operation is supplied from the position control circuit 123 to the microprocessor 114. When the track seek operation is completed, the microprocessor 114 starts the disk sequencer 133 of the hard disk controller 113 in Step ST36.

The disk sequencer 133 is controlled by various timing signals supplied from the timing generating circuit 124. The disk sequencer 133 reads write data temporarily stored in the buffer RAM 115 in predetermined timing. The serializer/deserializer 138 converts the write data into serial data, which is added with an error correction code by the ECC circuit 139, followed by its supply to the record data generating circuit 116.

In this case, the frame counter of the control register 134 is counted up in response to the frame pulse output from the timing generating circuit 124. The present sector number of the control register 134 is counted up in response to the sector pulse output from the timing generating circuit 124.

It is determined in Step ST37 whether or not the count value has coincided with the start frame number. If it is determined in Step ST37 that the count value has coincided with the start frame number, it is then determined in Step ST38 whether or not the present sector number has coincided with the start sector number. If the answer is found to be YES in Step ST39, it is determined in Step ST39 whether or not the out-of-synchronism state has occurred. When the PLL lock signal is not output from the clock generating circuit 501 of the synchronous management circuit 150 or the frame clock signal is not output from the frame manager 503, it is determined that the out-of-synchronism state has occurred.

If it is determined in Step ST39 that the out of synchronism state has occurred, then the microprocessor 114 urgently enters a write inhibiting process to turn off a write gate of the timing generating circuit 124 and to affect suitable processing on its peripheral circuits in Step ST40. Thereafter, the aforementioned initial synchronism establishing process is executed in Step ST41. In this case, the frame synchronizing process shown in FIG. 6 is executed when only the frame lock signal is not output.

If the answer is found to be NO in Step ST39, then the microprocessor 114 proceeds to Step ST42. In Step ST42, the microprocessor 114 confirms the absence of a defective sector (defect=0), the storage of the write data in the buffer RAM 115, etc., by reference to the sector ID information table 115T of the buffer RAM 115. After conditions are met, the microprocessor 114 reads the write data from the buffer RAM 115 and transfers it to the record data generating circuit 116. As a result, the recording of data is started.

Figure 14:
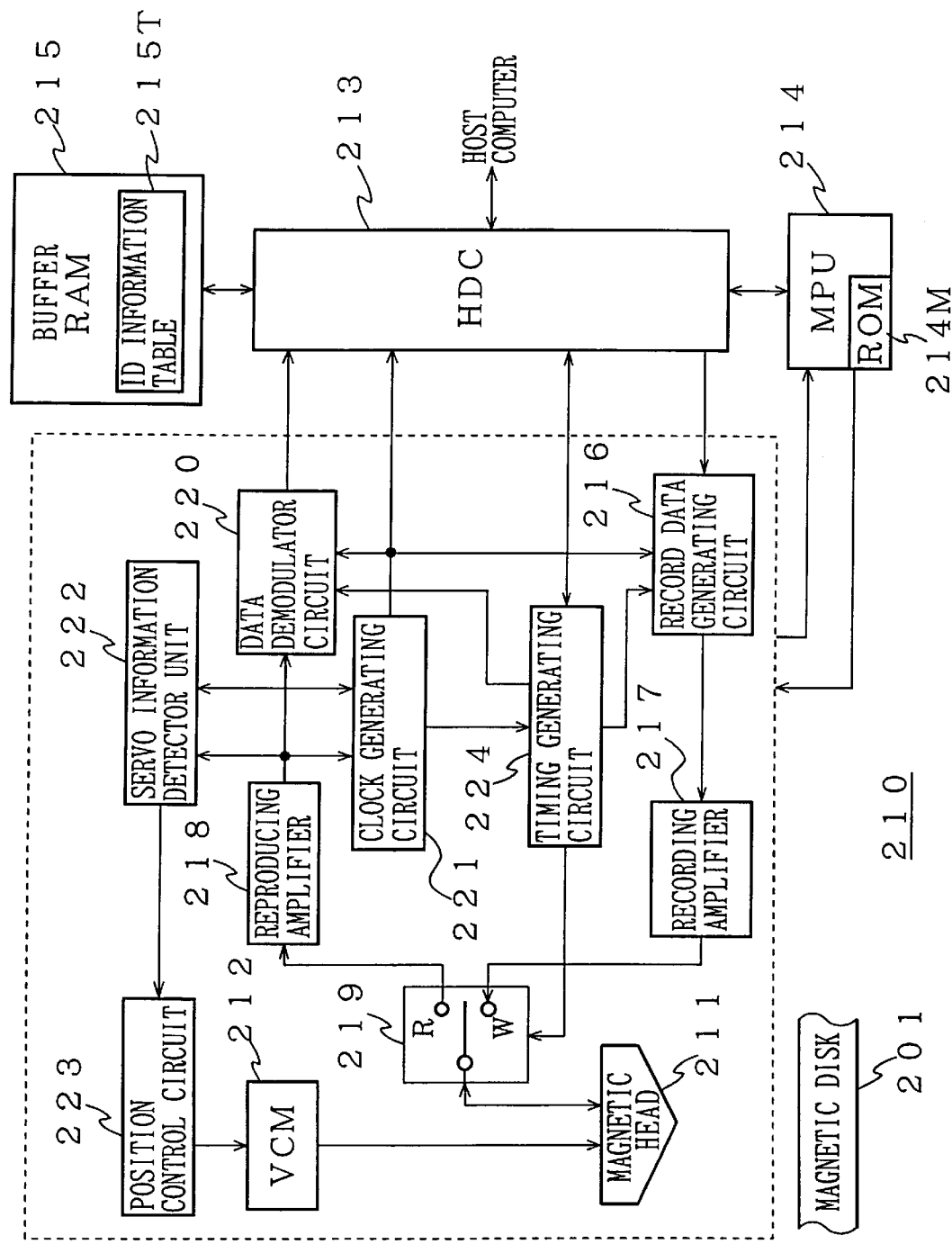
FIG. 14 is a block diagram illustrating one example of a conventional sector ID-less type magnetic disk unit.
Figure 17:
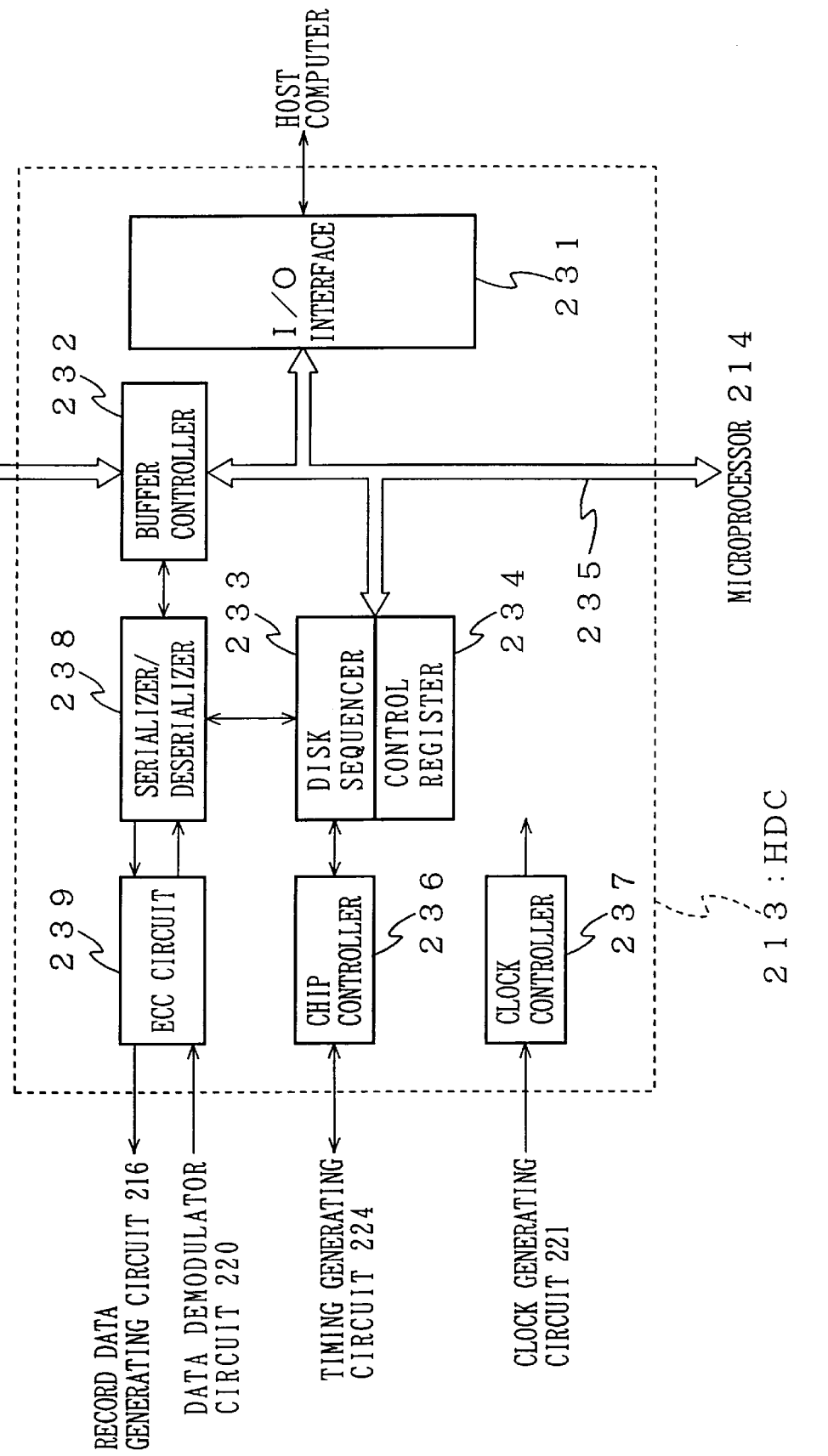
FIG. 17 is a block diagram illustrating an example of a configuration of a hard disk controller.
Figure 18:
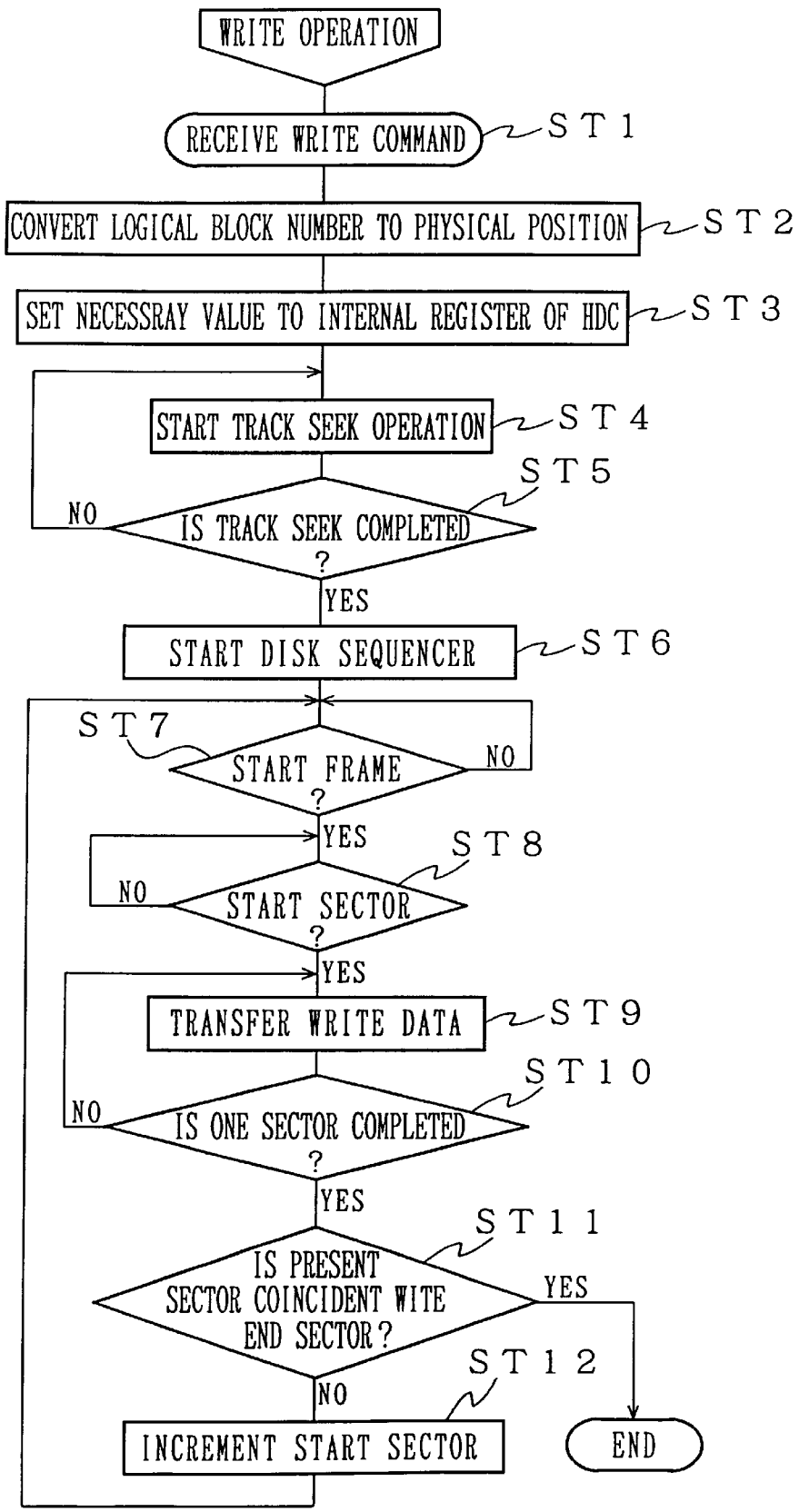
FIG. 18 is a flowchart for describing a write operation of a conventional magnetic disk unit.

It is next determined in Step ST43 whether one sector has been completed. If the answer is found to be NO in Step ST43, then the routine procedure is returned to Step ST39. If the answer is found to be YES in Step ST43, it is determined in Step ST44 whether the present sector number coincides with the end sector number. If it is determined in Step ST44 that the present sector number does not coincide with the end sector number, then the start sector number is changed so as to correspond to the next sector in Step ST45. Thereafter, the routine procedure is returned to Step ST37 where the same control as described above is executed. On the other hand, when it is determined in Step ST45 that the present sector number coincides with the end sector number, then the write operation is completed. Incidentally, other operations are similar to those executed in a conventional magnetic disk unit 210 shown in FIG. 14.

Control of the read operation is performed in a manner similar to the control of the write operation. The disk sequencer 133 is started after the completion of track seek. Next, the start sector is accessed and the ECC circuit 139 performs an error correction process on read data output from the data demodulator circuit 120. Further, the so-processed read data is converted into parallel data by the serializer/deserializer 138, which in turn is supplied to the buffer RAM 115 where it is temporarily stored. Thereafter, the data is transferred to the host computer through the I/O interface 131. Incidentally, the selector switch 119 is electrically connected to the R side upon this reading.

In the present embodiment as described above, the segment ID 105 having the information about the frame numbers (segment numbers) is recorded in the address region of the servo region on the magnetic disk 101 every 4 segments. Therefore, the synchronous management circuit 150 of the magnetic disk unit 110 can establish frame synchronization, using the segment ID 105 without the need for detecting the home index pattern as in a conventional system. Accordingly, the frame synchronization can be rapidly established as compared with the conventional magnetic disk unit 210. For example, a reduction in transfer rate at the time that data is recorded on and reproduced from both surfaces of the magnetic disk, can be controlled.

Even upon writing, an out-of-frame synchronization state can be detected using the segment ID 105. When the frame synchronization is out, the microprocessor 114 can be shifted to the urgent write inhibiting process. Thus, the sector ID-less system can promptly avoid writing errors in order to keep the destruction of data to a minimum and can greatly improve the reliability of data.

When no CRC-OK signal is supplied from the segment ID detector 513 of the servo information detector unit 151 each time the data in the address region results in the segment ID 105 in the aforementioned embodiment, the microprocessor 114 proceeds to an out-of-frame synchronization process. Thus, the microprocessor 114 proceeds to the out-of-frame synchronization process for each bit error.

When a low bit error rate is slightly high in this case, a state in which out-of-synchronism is found to have occurred even though synchronism is occurrence in practice, is brought about. When the low bit error rate is about $10^{-6}$, out-of-frame synchronization is detected once per 10 seconds, when 10 bits/code, 100 pieces/perimeter, 100 revolutions/second, etc. are supposed.

Thus, only when the segment ID 105 is a recorded segment, the CRC-OK signal is output from the segment ID detector 513 and the coincidence detection signal is not output from the frame counter 502, will the frame manager 503 determine that out-of-synchronism has occurred. When no CRC-OK signal is output to the frame manager 503, a flag is first set and the detection of a unique pattern after two segments is utilized. When the unique pattern is detected after two segments, the flag is reset to keep the normal locked state as it is. On the other hand, when no unique pattern is detected after two segments, the frame manager 503 determines that out-of-frame synchronization has occurred and proceeds to the out-of-synchronism process. That is, the out of frame synchronization is synthetically determined in a series without being determined at one point. Thus, the erroneous determination of the signal as the out of synchronism during synchronism can be reduced.

Figure 8:
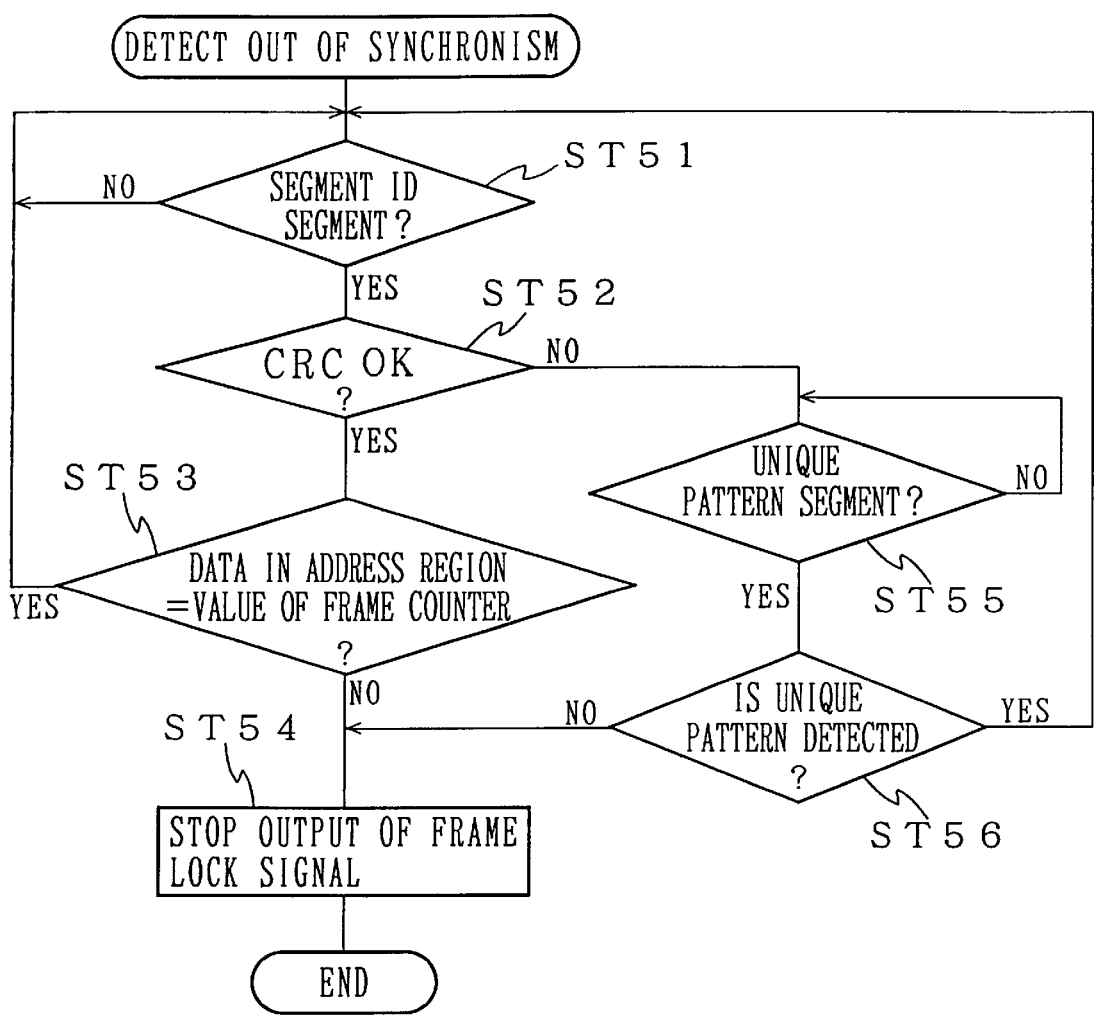
FIG. 8 is a flowchart for describing another example of an asynchronism detecting process.

A flowchart shown in FIG. 8 shows being out-of-synchronism actual detecting process of the frame manager 503.

In Step ST51, the frame manager 503 determines by reference to the count of the 4-segment counter whether the segment ID 105 corresponds to the recorded segment. If it is determined in Step ST51 that the segment ID 105 is of the recorded segment, then the frame manager 503 determines in Step STS2 whether the CRC-OK signal is output from the segment ID pattern detector 512.

When it is determined in Step ST52 that the CRC-OK signal is output, it is determined in Step ST53 whether a coincidence detection signal has been output from the frame counter 502, i.e., the data in the address region coincides with the count of the frame counter. If it is determined in Step ST52 that no coincidence detection signal is output, then the frame manager 503 determines that out-of-frame synchronization has occurred. In Step ST54, the frame manager 503 stops the output of the frame lock signal and finishes the out-of-synchronism detecting process. On the other hand, when the coincidence detection signal is output, the frame manager 503 returns to Step ST51 where it is kept locked.

When it is determined in Step ST52 that the CRC-OK signal is not output from the segment ID pattern detector 512, it is determined in Step ST55 by reference to the count of the 4-segment counter whether the unique pattern 106 corresponds to a recorded segment. If it is determined in Step ST55 that the unique pattern 106 corresponds to the recorded segment, it is then determined in Step ST56 whether the unique pattern 106 has been detected by the unique pattern detector 511. If it is determined in Step ST56 that no unique pattern 106 is detected, then the frame manager 503 determines that out-of-frame synchronization has occurred. In Step ST54, the frame manager 503 stops the output of the frame lock signal and finishes the out-of-synchronism detecting process. On the other hand, when the unique pattern 106 is detected, the frame manager 503 returns to Step ST51 where it is kept in a locked state as it is.

In the aforementioned embodiment, the frame number codes of the segment ID indicate the frame numbers (segment numbers) as they are (see FIG. 2). However, the frame number codes of the segment ID may indicate numbers obtained by shifting the frame number codes from frame numbers by a predetermined number (24 in the present embodiment) as shown in FIG. 9.

Thus, since irregularities in a specific region on the magnetic disk 101, which have been obtained by creating servo information in accordance with an irregular pit collective molding method, can be prevented from shifting, a variation in the amount of floatation of the magnetic head 111 can be restrained.

Further, a problem in which the result of CRC computation is determined as being proper to an erroneous whole 0 data series, can be avoided. When all the data corresponding to the segment ID pattern 105 reach 0 due to a reduction in the level of a reproduced signal, the CRC-OK signal is output from the segment ID detector 512 even if the data in the address region differs from the count of the frame counter 502. Therefore, it is determined that out-of-synchronism has occurred even during synchronism upon the out-of-synchronism detecting process shown in FIG. 8 (all 0 data result in 0 even if divided by any polynomial).

However, the CRC operation circuit detects and determines the result of CRC operation as an error with respect to all 0 data series by shifting the frame numbers by the predetermined number, as described above. In this case, the result of detection of the next unique pattern 106 is placed in a waiting state upon the out-of-synchronism detecting process shown in FIG. 8. When the unique pattern 106 is detected, the frame continues to lock. Thus, the determination of the signal as the out-of-synchronism during actual synchronism can be lessened.

In the aforementioned embodiment, the access pattern 104, the segment ID 105 and the unique pattern 106 have been recorded in the address regions of the servo region on the magnetic disk 101. However, it is also considered that only the access pattern 104 and the segment ID 105 are recorded in the address region. In this case, a current or voltage generated from a coil of a spindle motor is detected and processed by the microprocessor 114 upon the initial synchronism establishing process to determine the approximate position of rotation of the disk, whereby the position of the clock mark 102 can be recognized.

Figure 10:
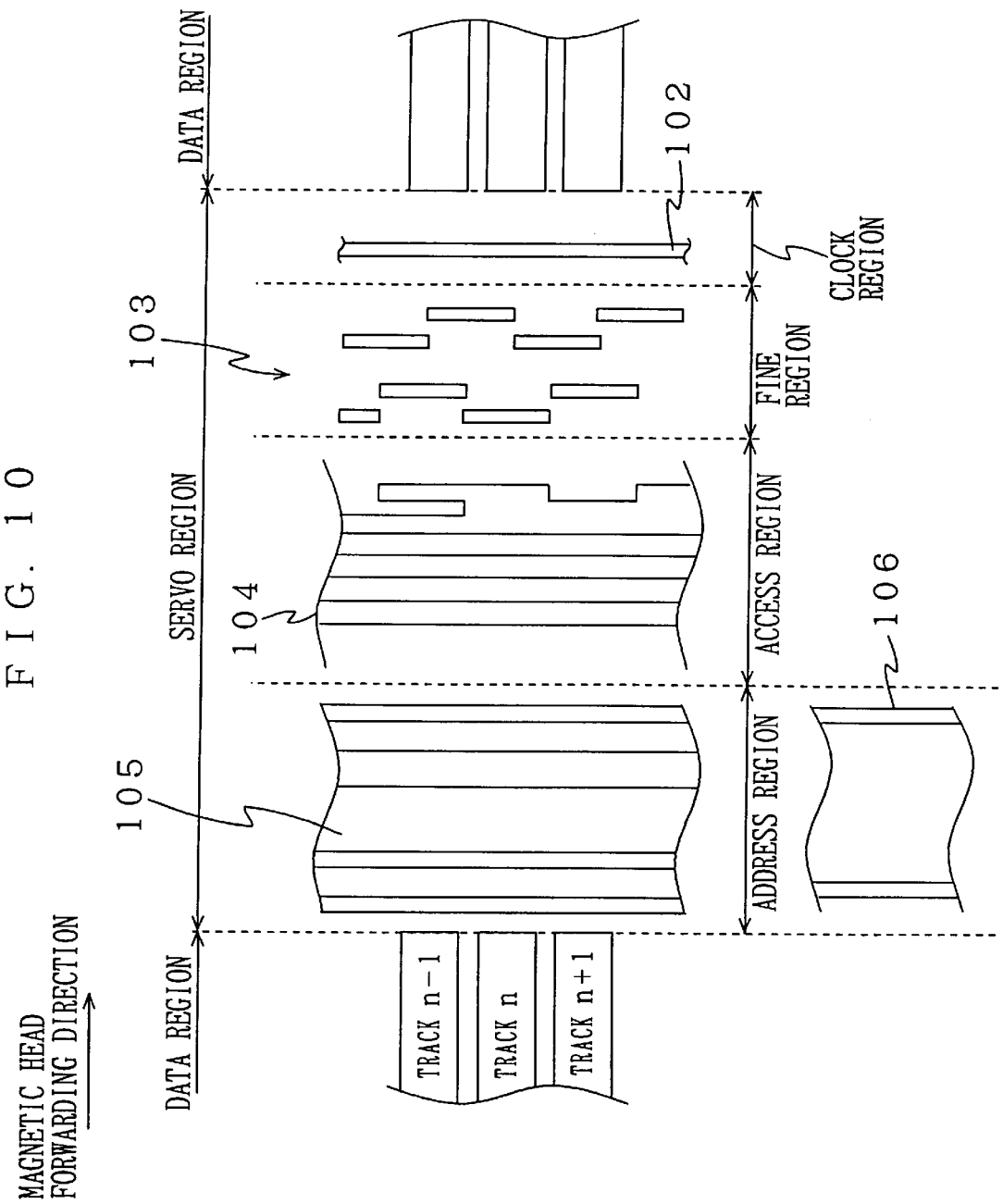
FIG. 10 is a diagram showing another example of the magnetic disk.

In the aforementioned embodiment as well, the access pattern 104, the segment ID 105 and the unique pattern 106 have been recorded in the address region of the servo region on the magnetic disk 101. However, it is also considered that, as shown in FIG. 10, an access region is provided between an address region and a fine region in a servo region, a segment ID 105 and a unique pattern 106 are alternately recorded in the address region, and only an access pattern 104 is recorded in the access region. Since the number of access patterns 104 increases in this case, the accuracy of track seek is improved. Further, since the number of segment IDs 105 increases and the unique patterns 106 formed in the same region are specific patterns, it is possible to establish frame synchronization more promptly and with satisfactory accuracy.

Moreover, in the aforementioned embodiment, the segment ID 105, the unique pattern 106 and the access pattern 104 are alternately and uniformly disposed in a 1:1:2 ratio. However, they are not necessarily limited to this. For example, the access patterns 104 are used as they are and the number of the unique patterns 106 can be reduced. For example, specific information such as a surface number is patterned and recorded in the remaining regions. Alternatively, the remaining regions may be used as gaps.

If the position control circuit 123 is able to perform position control in a lower control sampling period or cycle, then the number of the access patterns 104 is reduced and three patterns may be disposed uniformly. Further, the segment IDs 105 may be formed in a separate region. Alternatively, they may be formed in all the segments. Further, they may be disposed in, for example, start segments of sectors alone without being disposed uniformly.

Although the segment IDs are constructed with the CRC, the CRC may be omitted. Any type may be used as the CRC generating function. Even though a system having 100 or more as the number of the segments is assumed, the number of the segments may be reduced. Even if the segment ID 105 is recorded in all the segments, format losses are not large.

Further, the result of computation of the segment ID and CRC, the result of detection of the unique pattern or the result of detection of the access pattern may be used in combination different from the combination used for the out-of-synchronism detecting process shown in FIG. 8 to detect out-of-synchronism. When, for example, data corresponding to the segment ID 105 is different from the count of the frame counter 502, the subsequent unique patterns 106 may be continuously confirmed twice. Of course, the segment IDs 105 may be continuously confirmed twice.

Further, the CRC operation circuit may detect each unique pattern 106. Since the result of CRC operation with respect to the unique pattern 106 can beset to aspecific value, e.g., a value other than 0, the unique pattern 106 can be detected. It is thus possible to efficiently detect the segment ID 105 and the unique pattern 106.

In the aforementioned embodiment, the initial synchronism is established by determining the segment ID 105 as the recorded segment, based on the CRC-OK signal. However, the segment ID 105 may be determined as the recorded segment by counting the number of frames from each unique pattern 106, for example.

In the aforementioned embodiment, the clock mark 102 and the unique patterns 106 are radially formed on the magnetic disk 101 in succession. However, they may be formed intermittently along the radius.

The aforementioned embodiment has described the case in which the servo information in the servo region, i.e., the clock mark 102, the fine patterns 103, the access patterns 104, the segment IDs 105 and the unique patterns 106 are recorded by forming the magnetic layer 101b on the non-magnetic substrate 101a having the irregular pit string formed by siamese molding, for example. However, the present invention can be applied to one for magnetically recording servo information in the servo region on the flat magnetic disk as in the prior art in the same manner as described above.

In the aforementioned embodiment, the magnetic head 111 is used as a general dual-purpose recording/reproducing head. However, heads dedicated for recording and reproduction may be used. Alternatively, a reproducing head based on another principle may be used if the patterns such as the magnetic clock mark, etc. in the above-described servo region and the magnetic inversion in the data region can be detected.

Although the recordable and reproducible magnetic disk unit has been considered in the aforementioned embodiment, a device dedicated to reproduction may be used. Alternatively, a magneto-optic disk unit or optical disk device may be used. Further, the present invention can be applied to a sector servo system as well as a sample servo system.

Industrial Applicability

As described above, a disk-shaped recording medium and a disk unit using it are suitable for use in a magnetic disk unit, an optical disk device or the like.

What is claimed is:

1. A disk-shaped recording medium having concentric or spiral tracks each divided into a plurality of segments in the direction of rotation thereof,
wherein each segment comprises a servo region for recording servo information and a data region for recording user data, and
wherein said servo information recorded in said servo region includes a segment ID indicative of a position of a direction of rotation of said disk-shaped recording medium, said segment ID being a code having information about a segment number as viewed from a position of an origin.

2. The disk-shaped recording medium according to claim 1, wherein said servo region has an access pattern recording region for recording an access pattern indicative of address information of said segment and said segment ID is recorded in said access pattern recording region every predetermined number of said access pattern recording regions.

3. The disk-shaped recording medium according to claim 1, wherein said servo region has an initial synchronous auxiliary pattern recording region for recording an initial synchronous auxiliary pattern utilized upon execution of initial synchronization, and said segment ID is recorded in said initial synchronous auxiliary pattern recording region every predetermined number of said initial synchronous auxiliary pattern recording regions.

4. The disk-shaped recording medium according to claim 1, wherein said servo region has an access pattern recording region for recording an access pattern indicative of address information of said segment, and said segment ID is recorded in said access pattern recording region every first predetermined number of said access pattern recording regions and an initial synchronous auxiliary pattern utilized upon execution of initial synchronization is recorded in said access pattern recording region every second predetermined number of said access pattern recording regions.

5. The disk-shaped recording medium according to claim 1, wherein said segment ID is recorded with a cyclic error detection code added thereto.

6. The disk-shaped recording medium according to claim 5, wherein said cyclic error detection code is generated with a polynomial divided by (x+1) as a generating function.

7. The disk-shaped recording medium according to claim 5, wherein said cyclic error detection code is generated with a polynomial divided by a primitive irreducible generating function as a generating function.

8. The disk-shaped recording medium according to claim 5, wherein said cyclic error detection code is generated with a polynomial divided by (x+1)×(primitive irreducible generating function) as a generating function.

9. The disk-shaped recording medium according to claim 3, wherein said segment ID is recorded with a cyclic error detection code added thereto and said initial synchronous auxiliary pattern is a code word non-corresponding to a predetermine value indicative of an error-free result of error detection and operation corresponding to said cyclic error detection code.

10. The disk-shaped recording medium according to claim 4, wherein said segment ID is recorded with a cyclic error detection code added thereto and said initial synchronous auxiliary pattern is a code word non-corresponding to a predetermined value indicative of an error-free result of error detection and operation corresponding to said cyclic error detection code.

11. The disk-shaped recording medium according to claim 1, wherein said segment ID is a code word selected from a code space excluding code words all brought to 0.

12. The disk-shaped recording medium according to claim 4, wherein the number of the access patterns and the initial synchronous auxiliary patterns per track are an integral multiple of the number of the segment IDs.

13. The disk-shaped recording medium according to claim 1, wherein the number of the segments per track is at least 100.

14. The disk-shaped recording medium according to claim 1, wherein said servo information is recorded in the servo region by irregular pits.

15. A disk unit for accessing a disk-shaped recording medium having concentric or spiral tracks each divided into a plurality of segments in the direction of rotation thereof and wherein each segment comprises a servo region for recording servo information and a data region for recording user data, and said servo information recorded in said servo region includes a segment ID indicative of a position of a direction of rotation of said disk-shaped recording medium, said segment ID being a code having information about a segment number as viewed from a position of an origin, comprising:

servo information reproducing means for reproducing the servo information from said servo region;

segment ID detecting means for detecting the segment ID from said reproduced servo information; and synchronism managing means for establishing frame synchronization using the detected segment ID.

16. The disk unit according to claim 15, wherein said synchronism managing means has a frame counter for loading the number of frames indicated by a first segment ID detected by said segment ID detecting means and outputting a count value counted up in accordance with a frame pulse for each segment, and frame synchronization confirming means for confirming the establishment of frame synchronization from a result that the number of frames indicated by a second segment ID detected by said segment ID detecting means subsequent to the first segment ID is identical to said count value.

17. The disk unit according to claim 15, wherein said segment ID is recorded with a cyclic error detection signal added thereto and the segment ID detected by said segment ID detecting means is effective when the result of error detection and operation, which corresponds to said cyclic error detection code, reaches a predetermined value indicative of the absence of an error.

18. The disk unit according to claim 15, wherein the servo information recorded in said servo region includes synchronous auxiliary patterns, and further includes synchronous auxiliary pattern detecting means for detecting the synchronous auxiliary pattern from the servo information reproduced by said servo information reproducing means, and said synchronism managing means establishes frame synchronization using the synchronous auxiliary pattern detected by said synchronous auxiliary pattern detecting means in addition to the segment ID detected by said segment ID detecting means.

19. The disk unit according to claim 18, wherein said synchronism managing means establishes frame synchronization using the segment ID when after the synchronous auxiliary pattern has been detected from servo information including a first segment by said synchronous auxiliary pattern detecting means, the synchronous auxiliary pattern is detected from servo information including a second segment in timing provided to detect the synchronous auxiliary pattern by said synchronous auxiliary pattern detecting means.

20. The disk unit according to claim 15, wherein the servo information recorded in the servo region includes a access pattern and further includes access pattern detecting means for detecting said access pattern from the servo information reproduced by said servo information reproducing means, and wherein said synchronism managing means establishes frame synchronization, using the access pattern detected by said access pattern detecting means in addition to the segment ID detected by said segment ID detecting means.

21. The disk unit according to claim 20, wherein said synchronism managing means establishes frame synchronization using the segment ID when after the access pattern has been detected from servo information including a first segment by said access pattern detecting means, the access pattern is detected from servo information including a second segment in timing provided to detect the access pattern by said access pattern detecting means.

22. The disk unit according to claim 16, wherein said segment ID is recorded with a cyclic error detection code added thereto, and said synchronism managing means has an out-of-synchronism detecting means for detecting an out-of-synchronism state when after frame synchronization has been confirmed by said frame synchronization confirming means, an error is undetected from the segment ID detected by said segment ID detecting means by an error detection and operation corresponding to a cyclic error detection code and the number of frames indicated by the segment ID is different from the count value of said frame counter.

23. The disk unit according to claim 22, further including write control means for performing control to stop a write operation when the out-of-synchronism state is detected by said out-of-synchronism detecting means.

* * * * *